(12) United States Patent
Ishida et al.

(10) Patent No.: US 10,498,913 B2
(45) Date of Patent: Dec. 3, 2019

(54) IMAGE FORMING APPARATUS

(71) Applicant: CANON KABUSHIKI KAISHA, Tokyo (JP)

(72) Inventors: Yasushi Ishida, Tokyo (JP); Haruo Uchida, Yokohama (JP); Mitsuyuki Fujibayashi, Kawasaki (JP); Izumi Fujiwara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/652,051

(22) Filed: Jul. 17, 2017

(65) Prior Publication Data
US 2018/0034986 A1  Feb. 1, 2018

(30) Foreign Application Priority Data

Jul. 29, 2016  (JP) .................................. 2016-150422
Jul. 29, 2016  (JP) .................................. 2016-150423

(51) Int. Cl.
*G06K 15/00* (2006.01)
*H04N 1/00* (2006.01)

(52) U.S. Cl.
CPC ..... *H04N 1/00527* (2013.01); *H04N 1/00411* (2013.01); *H04N 1/00525* (2013.01); *H04N 1/00535* (2013.01); *H04N 1/00543* (2013.01); *H04N 1/00551* (2013.01); *H04N 1/00554* (2013.01); *H04N 1/00557* (2013.01); *H04N 1/00602* (2013.01); *H04N 1/00625* (2013.01); *H04N 2201/0094* (2013.01)

(58) Field of Classification Search
CPC ........... H04N 1/00527; H04N 1/00525; H04N 1/00543; H04N 1/00554; H04N 1/00551; H04N 1/00602; H04N 1/00625; H04N 1/00795; H04N 2201/0094
USPC .......................... 358/496, 498; 399/364, 367
See application file for complete search history.

(56) References Cited

U.S. PATENT DOCUMENTS 4,745,436 A * 5/1988 Matsuura ........... G03G 15/5004
                                                    355/75
5,008,715 A * 4/1991 Imaizumi ........... G03G 15/6502
                                                    399/392

(Continued)

FOREIGN PATENT DOCUMENTS

CN         101131552 A      2/2008
CN         101350874 A      1/2009
(Continued)

*Primary Examiner* — Cheukfan Lee
(74) *Attorney, Agent, or Firm* — Canon U.S.A., Inc. IP Division

(57) ABSTRACT

There is provided an image forming apparatus including a scanner unit configured to be openable on an apparatus front side with respect to a printer unit due to a first hinge portion on an apparatus rear side, a cover to cover a feed port configured to be openable due to a second hinge portion on the apparatus front side of the feed port, wherein a rotation axis of the first hinge portion is positioned on the apparatus rear side of a rotation axis of the second hinge portion in an apparatus depth direction. Interlocking with an operation to open the scanner unit, the cover moves while a portion thereof is in contact with a surface of the paper feed tray or the sheet placed thereon to open the cover in an interlocking manner.

17 Claims, 15 Drawing Sheets

(56) References Cited

U.S. PATENT DOCUMENTS

| | | | | |
|---|---|---|---|---|
| 5,844,687 A * | 12/1998 | Nagane | H04N 1/00681 | 358/296 |
| 5,913,095 A * | 6/1999 | Takashima | G03G 21/1628 | 271/213 |
| 6,234,696 B1 * | 5/2001 | Whittaker | B41J 15/042 | 400/613 |
| 7,194,219 B2 * | 3/2007 | Sato | G03G 15/5016 | 399/367 |
| 7,551,332 B2 * | 6/2009 | Itoi | H04N 1/1017 | 355/25 |
| 7,773,267 B2 * | 8/2010 | Kim | H04N 1/00535 | 358/296 |
| 9,731,528 B2 * | 8/2017 | Akahane | B41J 29/02 | |
| 2002/0051161 A1 * | 5/2002 | Kanazawa | G03G 15/50 | 358/1.12 |
| 2003/0231359 A1 * | 12/2003 | Hayashi | H04N 1/00411 | 358/498 |
| 2004/0161280 A1 * | 8/2004 | Lee | B41J 13/103 | 400/693 |
| 2005/0105933 A1 * | 5/2005 | Kim | G03G 15/6552 | 399/107 |
| 2006/0051125 A1 * | 3/2006 | Nakayama | G03G 21/1638 | 399/110 |
| 2006/0261539 A1 * | 11/2006 | Terada | G03G 15/6502 | 271/162 |
| 2007/0086795 A1 * | 4/2007 | Pee | G03G 15/605 | 399/16 |
| 2008/0044208 A1 * | 2/2008 | Motoyoshi | G03G 15/6514 | 399/376 |
| 2008/0181695 A1 * | 7/2008 | Andoh | G03G 15/6552 | 399/361 |
| 2009/0230611 A1 * | 9/2009 | Ngai | H04N 1/00525 | 271/145 |
| 2011/0317225 A1 * | 12/2011 | Caspar | H04N 1/00525 | 358/474 |
| 2013/0188209 A1 * | 7/2013 | Horikawa | H04N 1/00546 | 358/1.13 |
| 2013/0257960 A1 * | 10/2013 | Nakano | B41J 11/02 | 347/16 |
| 2013/0315610 A1 * | 11/2013 | Utagawa | G03G 15/607 | 399/21 |
| 2014/0009532 A1 * | 1/2014 | Nagase | B41J 2/165 | 347/31 |
| 2014/0009550 A1 * | 1/2014 | Togo | B41J 13/0009 | 347/104 |
| 2014/0027969 A1 * | 1/2014 | Kondo | B65H 3/44 | 271/9.02 |
| 2014/0043410 A1 * | 2/2014 | Nakano | B41J 2/17553 | 347/86 |
| 2014/0153065 A1 * | 6/2014 | Mori | H04N 1/00623 | 358/482 |
| 2014/0284876 A1 * | 9/2014 | Mizuno | B65H 1/00 | 271/253 |
| 2014/0291914 A1 * | 10/2014 | Tamura | B65H 7/04 | 271/9.11 |
| 2014/0292986 A1 * | 10/2014 | Oki | B41J 3/60 | 347/104 |
| 2014/0368594 A1 * | 12/2014 | Tamura | B41J 13/0045 | 347/104 |
| 2015/0002864 A1 * | 1/2015 | Yamamoto | G06K 15/4065 | 358/1.2 |
| 2015/0002883 A1 * | 1/2015 | Hibi | G06K 15/4065 | 358/1.14 |
| 2015/0035220 A1 * | 2/2015 | Nunokawa | B65H 1/266 | 271/4.03 |
| 2015/0077815 A1 * | 3/2015 | Okazawa | H04N 1/00551 | 358/474 |
| 2015/0091247 A1 * | 4/2015 | Iijima | B65H 1/04 | 271/264 |
| 2015/0181062 A1 | 6/2015 | Takahata | | |
| 2015/0274473 A1 * | 10/2015 | Miwa | G03G 15/6552 | 399/401 |
| 2015/0294195 A1 * | 10/2015 | Shirota | B41J 3/36 | 358/1.8 |
| 2015/0326744 A1 * | 11/2015 | Onuki | H04N 1/00737 | 358/1.2 |
| 2015/0347065 A1 * | 12/2015 | Tsujita | G03G 15/502 | 358/1.15 |
| 2016/0107463 A1 * | 4/2016 | Maeda | B41J 11/008 | 347/16 |
| 2016/0185138 A1 * | 6/2016 | Takeuchi | B65H 1/266 | 271/9.09 |
| 2016/0198062 A1 * | 7/2016 | Peng | H04N 1/2034 | 358/496 |
| 2016/0231969 A1 * | 8/2016 | Kashiwagi | G06F 3/1253 | |
| 2016/0257146 A1 * | 9/2016 | Akahane | B41J 29/02 | |
| 2016/0267363 A1 * | 9/2016 | Hirai | G06F 3/1206 | |
| 2017/0223203 A1 * | 8/2017 | Miwa | H04N 1/00 | |
| 2017/0246869 A1 * | 8/2017 | Shirota | B41J 2/16505 | |
| 2017/0251117 A1 * | 8/2017 | Shirota | H04N 1/00533 | |
| 2017/0277497 A1 * | 9/2017 | Iwauchi | G06F 3/1205 | |
| 2018/0009226 A1 * | 1/2018 | Shimazu | B41J 2/16505 | |
| 2018/0034987 A1 * | 2/2018 | Yamauchi | H04N 1/00525 | |
| 2018/0034989 A1 * | 2/2018 | Fujibayashi | G03G 21/1633 | |
| 2018/0093499 A1 * | 4/2018 | Shirane | B41J 13/0027 | |
| 2018/0097947 A1 * | 4/2018 | Takahashi | H04N 1/00482 | |
| 2018/0170694 A1 * | 6/2018 | Takagi | B65H 1/28 | |

FOREIGN PATENT DOCUMENTS

| | | |
|---|---|---|
| CN | 102474563 A | 5/2012 |
| CN | 104469049 A | 3/2015 |
| JP | 06179529 A * | 6/1994 |
| JP | 08113379 A * | 5/1996 |
| JP | 2007028108 A * | 2/2007 |
| JP | 2011031622 A | 2/2011 |
| JP | 2011073449 A | 4/2011 |

* cited by examiner

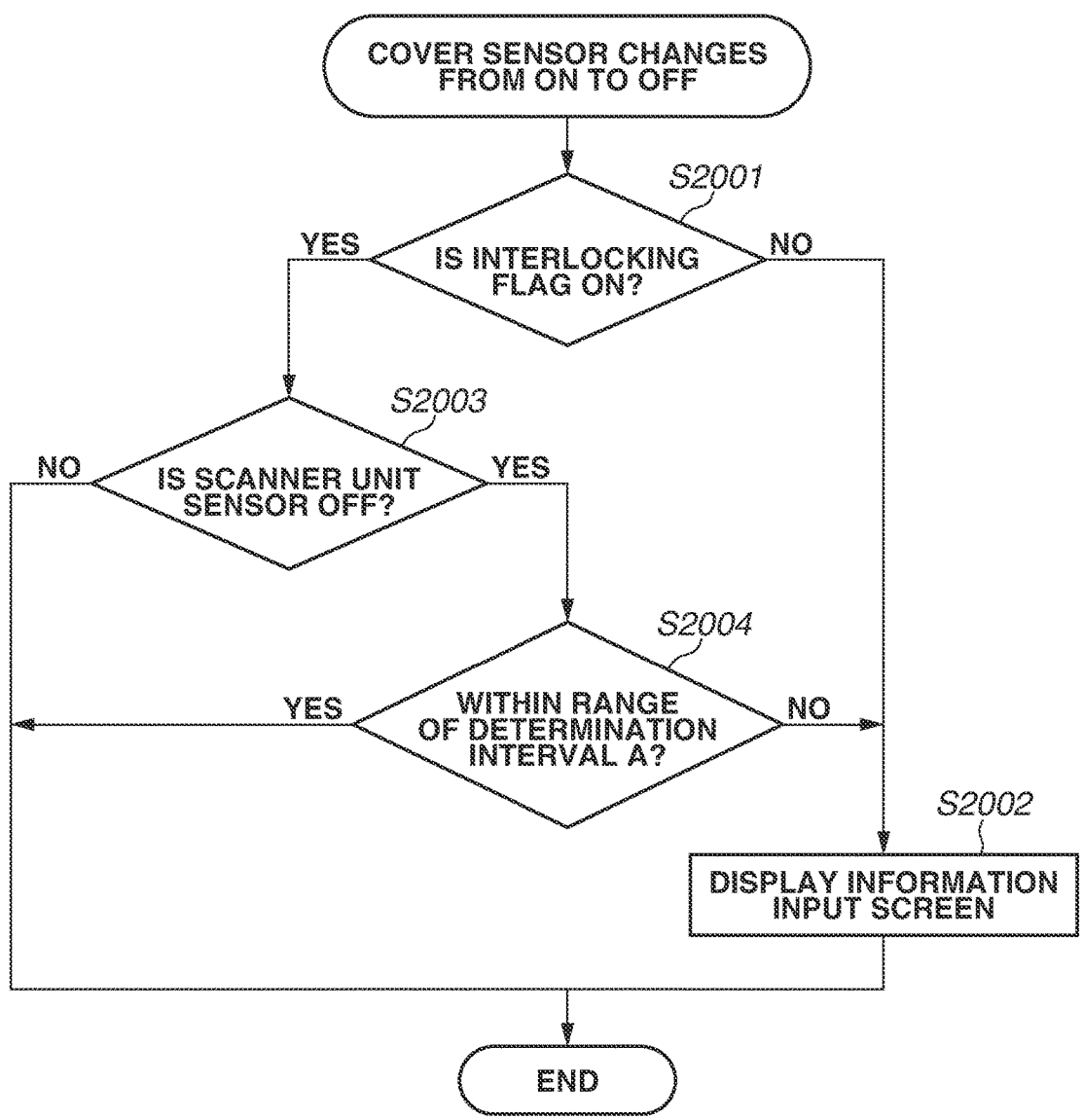

FIG.15A

PAPER SETTING
REGISTRATION SCREEN

```
PAPER INFORMATION REGISTRATION

SELECT SET PAPER.

PAPER SIZE      A4

PAPER TYPE      PLAIN PAPER

[ REGISTER ]
```

FIG.15B

SCREEN WHILE PAPER SIZE
BEING CHANGED

```
PAPER INFORMATION REGISTRATION

SELECT SET P|       A4
PAPER SIZE  |       B5
PAPER TYPE  |       A5

[ REGISTER ]
```

IMAGE FORMING APPARATUS

BACKGROUND OF THE INVENTION

Field of the Invention

The present invention relates to an image forming apparatus including a printer unit.

Description of the Related Art

Japanese Patent Application Laid-Open No. 2011-73449 discusses an image forming apparatus (multifunctional peripheral) in which a printer unit and a scanner unit are integrated. The apparatus includes a partition member that partitions between a feed port of the printer unit and the scanner unit, and even if a scanner cover is opened, foreign matter thereon is prevented from falling into the feed port.

According to Japanese Patent Application Laid-Open No. 2011-73449, the partition member is disposed on the rear side of the scanner and the feed port of the printer is disposed further at the rear side thereof. Thus, the apparatus as a whole increases in size, particularly in the depth direction and therefore, there is room for further improvements.

Also according to Japanese Patent Application Laid-Open No. 2011-73449, when the user newly sets paper to a paper feed tray, the size or type of paper may not necessarily match that registered in advance to a control unit of the apparatus. If the user forgets to re-set paper information that has been set at that time, printing may be done under erroneous printing conditions.

SUMMARY OF THE INVENTION

The present invention is directed to an image forming apparatus including both of a printer unit and a scanner unit to implement further downsizing. The present invention is also directed to an image forming apparatus including a printer unit that can appropriately set paper information when a user sets paper into a paper feed tray to implement an apparatus excellent in usability.

According to an aspect of the present invention, an image forming apparatus includes a printer unit, a scanner unit provided above the printer unit and configured to read a document, the scanner unit being openable on an apparatus front side with respect to the printer unit due to a first hinge portion on an apparatus rear side, a paper feed tray on which a sheet used by the printer unit is obliquely placed and configured to feed the sheet stacked thereon from a feed port to the printer unit, and a cover provided to be openable with respect to the feed port, the cover being openable on the apparatus rear side due to a second hinge portion different from the first hinge portion, wherein the second hinge portion is provided in the scanner unit so as to be positioned on the apparatus front side of the first hinge portion.

According to an second aspect of the present invention, an image forming apparatus comprising: a printer unit; a unit provided above the printer unit and configured to be openable with respect to the printer unit; a paper feed tray on which a sheet to be used by the printer unit is placed and configured to feed the sheet placed thereon from a feed port to the printer unit; a cover configured to be openable with respect to the feed port; and a control unit configured to perform information setting about the sheet placed on the paper feed tray when an open/close state of the cover changes.

Further features of the present invention will become apparent from the following description of exemplary embodiments with reference to the attached drawings.

BRIEF DESCRIPTION OF THE DRAWINGS

FIG. 13 is a flowchart of a sequence to be executed when a cover sensor changes from ON to OFF.

FIG. 14 is a flowchart of a sequence to be executed when a scanner unit sensor changes from OFF to ON.

FIGS. 15A and 15B are display examples of an information input screen.

DESCRIPTION OF THE EMBODIMENTS

As an exemplary embodiment of the present invention, an image forming apparatus (multifunctional peripheral) in which a printer unit and a scanner unit are integrated will be described. In the present specification, the apparatus is assumed to be installed on a horizontal plane, the front (or the forward) direction and the depth (or the rear) direction are defined along a direction in which the user faces the apparatus, and up and down are defined along the direction of gravity.

<Whole Configuration of Apparatus>

Figure 1A:
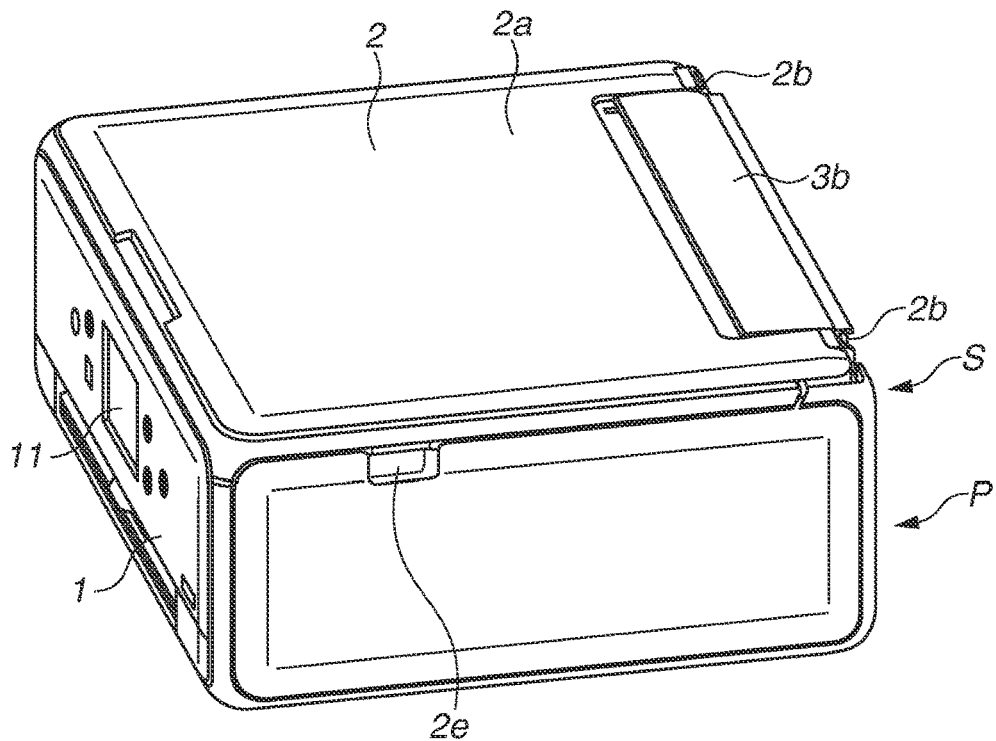
FIGS. 1A and 1B are perspective views illustrating an outer appearance of an image forming apparatus.
Figure 1B:
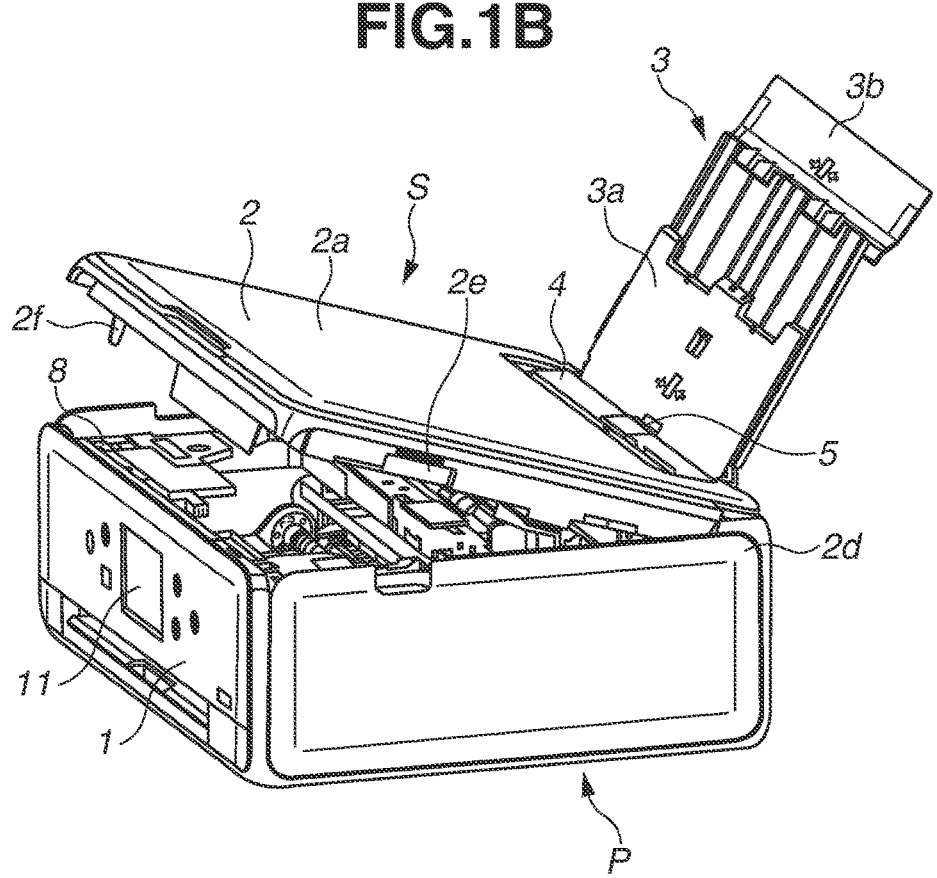

FIGS. 1A and 1B are perspective views each illustrating an outer appearance of an image forming apparatus according to an exemplary embodiment. The image forming apparatus roughly includes a printer unit P contained inside a housing of the apparatus body and a scanner unit S provided above the printer unit P to read a document placed thereon and pressed by a document pressing plate. An operation unit 1 includes a display unit 11 and an input key and is provided so as to face the user on the front side of the apparatus housing.

A paper feed tray 3 is provided on the rear side of the apparatus so as to cover a feed port described below. In FIG. 1A, the paper feed tray 3 is vertically accommodated on the rear side of the apparatus and only a paper feed flap 3b constituting a portion of the paper feed tray 3 is exposed on the top surface of the apparatus as an outer cover. When the user raises the paper feed flap 3b and pulls out upward and then lowers the paper feed tray 3 obliquely to the rear, as illustrated in FIG. 1B, a tray body 3a is exposed to form a sheet placement surface inclined with respect to the horizontal direction. The tray body 3a can increase the sheet placement surface by slide-expansion. The paper feed flap 3b serving as an outer cover in an accommodated state forms an extended tray surface continuing to the sheet placement surface by being pivotally moved with respect to the tray body 3a. FIG. 1B illustrates a state in which the tray body 3a is expanded and further extended by the paper feed flap 3b. A plurality of sheets to be printed by the printer unit can be placed on the inclined sheet placement surface of the paper feed tray 3, and sheets are fed to the printer unit through the feed port one by one.

Figure 4:
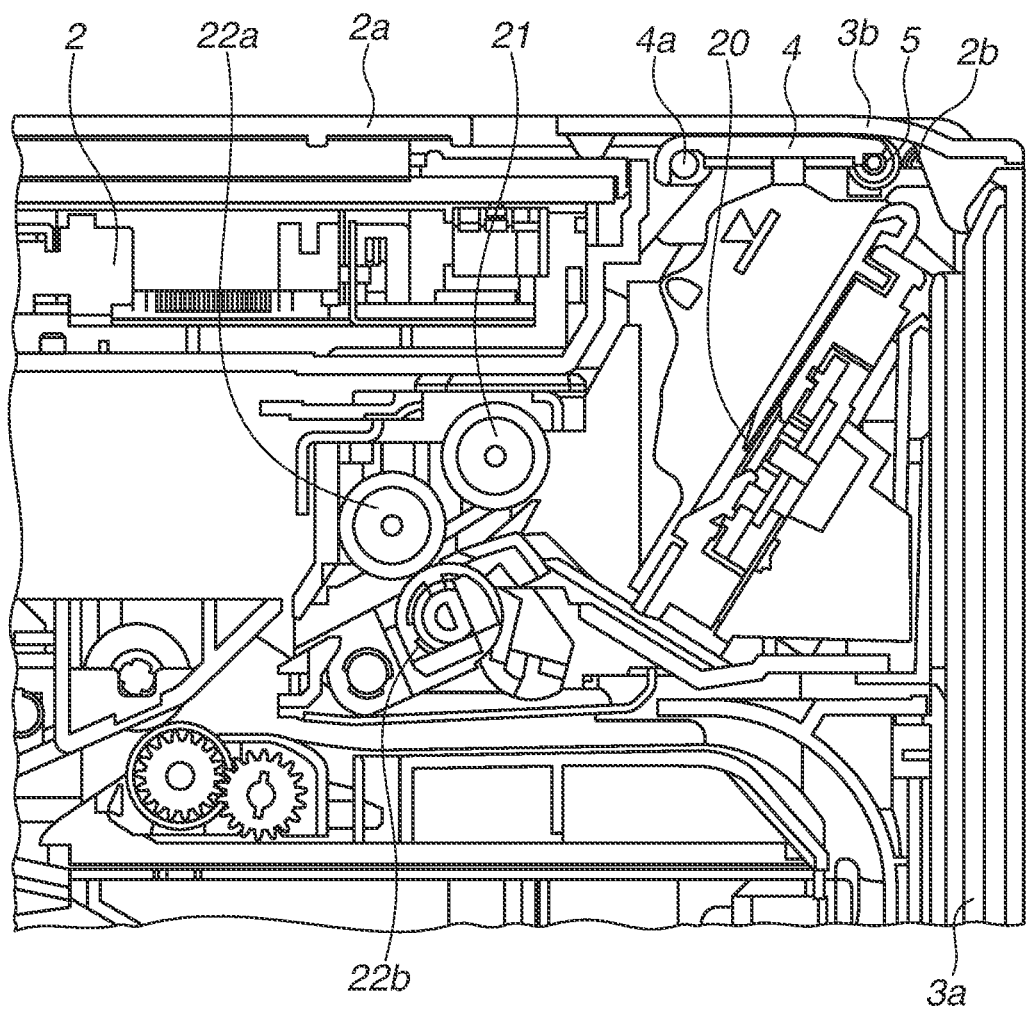
FIG. 4 is a sectional view of an apparatus rear side when the paper feed tray is accommodated.

As illustrated in FIG. 4, a pickup roller 21 and a separation roller pair 22a and 22b to separate and feed one sheet from set sheets 6 to a printing area of the printer unit are provided on the rear side of the feed port. Various sheets of different paper sizes and paper types can be placed on the paper feed tray 3 and the image forming apparatus performs appropriate printing according to the paper size and paper type to be used. The printer unit may be of the inkjet type, electrophotographic type, thermal type, or other printing types.

A scanner unit 2 (scanner unit S) is a flatbed scanner and presses a document placed on a platen glass (transparent glass plate) by a document pressing plate 2a. The scanner unit 2 including a sensor and a carriage to optically read the document is provided below the platen glass. The document pressing plate 2a can be opened and closed with respect to the platen glass. As illustrated in FIG. 1A, the surface of the document pressing plate 2a and the surface of the paper feed flap 3b have approximately the same height when the document pressing plate 2a and the paper feed flap 3b are both closed. Then, a recess portion into which the user can put the user's finger is formed between the front-side end of the paper feed flap 3b and the rear end of the document pressing plate 2a. The user can easily raise the paper feed flap 3b by putting The user's finger into the recess portion. Incidentally, instead of a manual operation, the opening and closing operation of the scanner unit 2 may be performed electrically using a drive source.

Figure 2A:
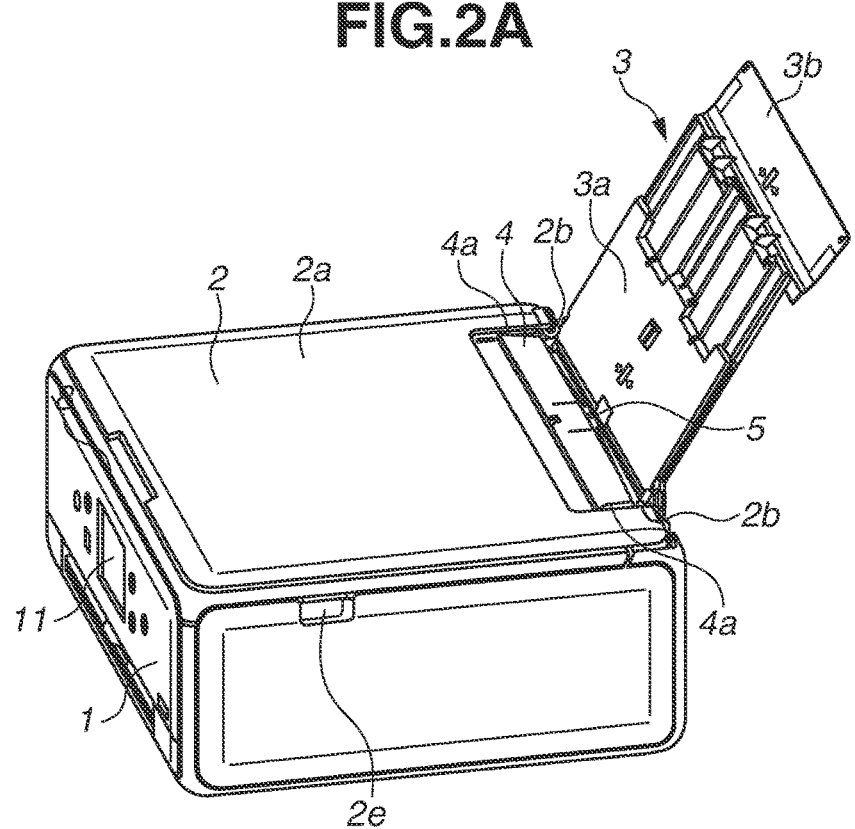
FIGS. 2A and 2B are perspective views respectively illustrating states in which an inner cover is closed and opened while a paper feed tray is pulled out.
Figure 2B:
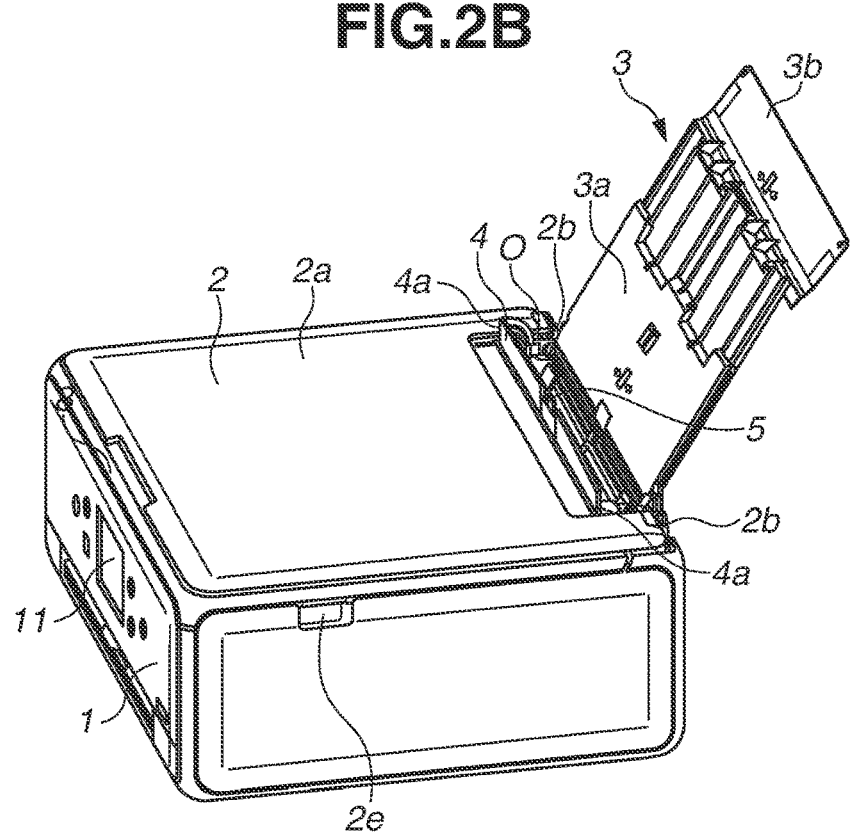

As illustrated in FIGS. 1B and 2B, the scanner unit S (scanner unit 2) is configured in such a manner that the apparatus front side can be opened by pivotally moving the scanner unit S with respect to the printer unit P positioned at the lower portion of the apparatus around a hinge portion (first hinge portion) disposed on the apparatus rear side. The rotation axis (rotational center) of the hinge portion is a position indicated as a supporting shaft 2d in FIGS. 5A and 5B. The hinge portion may have a hinge structure in which a rotation axis portion is actually present in the supporting shaft 2d or a hinge structure in which the position of the supporting shaft 2d is a virtual rotation axis. Alternatively, a hinge structure in which the supporting shaft 2d is displaced with pivotal movement may also be adopted. In the maintenance work, the user raises the scanner unit 2 upward by holding a handhold portion 2e as a recess portion provided on left and right side faces of the apparatus housing to cause the scanner unit 2 to pivotally move. In the present exemplary embodiment, the scanner unit 2 can be opened up to the angle of 30 degrees. Due to a free stop mechanism of the hinge portion, the scanner unit 2 maintains its position even if the user moves user's hand off the scanner unit 2 halfway. When the scanner unit 2 is opened, a portion of the printer unit in the apparatus body is exposed and the user can carry out maintenance work such as the replacement of an ink tank or removal of paper stopped due to a paper jam.

<Inner Cover>

In FIGS. 1B and 2A to 9, an inner cover 4 that is freely openable/closable and capable of covering the feed port when it is closed is provided below the sheet placement surface 3a of the paper feed tray 3. The inner cover 4 is pivotally movable using a supporting shaft 4a (second hinge portion) provided in the scanner unit 2 as a rotation axis (rotational center). The supporting shaft 4a is provided on the front side of the feed port relative to the scanner unit 2 and the apparatus rear side of the inner cover 4 can open and close with respect to the feed port. Thus, the inner cover 4 is provided to be freely openable and closable with respect to the feed port.

The inner cover 4 has a freely rotatable roller 5 at an outer end that pivotally moves. The roller 5 is considered as a portion of the inner cover 4. In this example, one roller 5 is provided at the center, but a plurality of rollers may be provided in a sheet width direction in a distributed manner. Here, the rotation axis of the hinge portion (first hinge portion) of the scanner unit 2 described above is positioned on the apparatus rear side of the rotation axis of the hinge portion (second hinge portion) of the inner cover 4. This arrangement relationship of the rotation axes (rotational centers) contributes to downsizing of the apparatus in the depth direction. Incidentally, each hinge portion may have a hinge structure in which the rotation axis thereof is displaced with pivotal movement. In that case, an area in which the rotation axis is displaced is considered as a rotation axis and the positional relationship between the rotation axes of the first hinge portion and the second hinge portion is made to satisfy the above relationship.

FIGS. 1A, 4 (sectional view), and 7 (sectional perspective view) illustrate a state in which the paper feed tray 3 is accommodated and the inner cover 4 is closed. In this state, the inner cover 4 is in a horizontal state and covers the feed port. The paper feed flap 3b further covers the inner cover 4 covering the feed port as an outer cover so as to cover the feed port by a double sealing structure of the paper feed flap 3b and the inner cover 4.

Figure 5A:
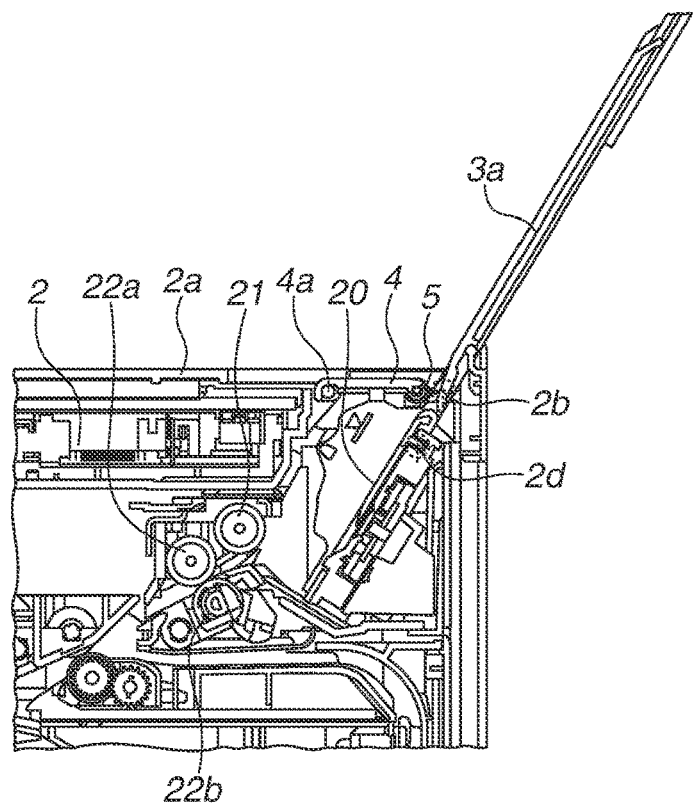
FIGS. 5A and 5B are sectional views of the apparatus rear side when the paper feed tray is pulled out.

FIGS. 1B, 2A, and 5A illustrate a state in which the paper feed tray 3 is pulled out by the user and the inner cover 4 is closed (no sheet is placed). In this state, the inner cover 4 is in a horizontal state and covers the feed port. The tip (roller 5) of the inner cover 4 does not barely touch the paper feed tray 3.

Figure 8A:
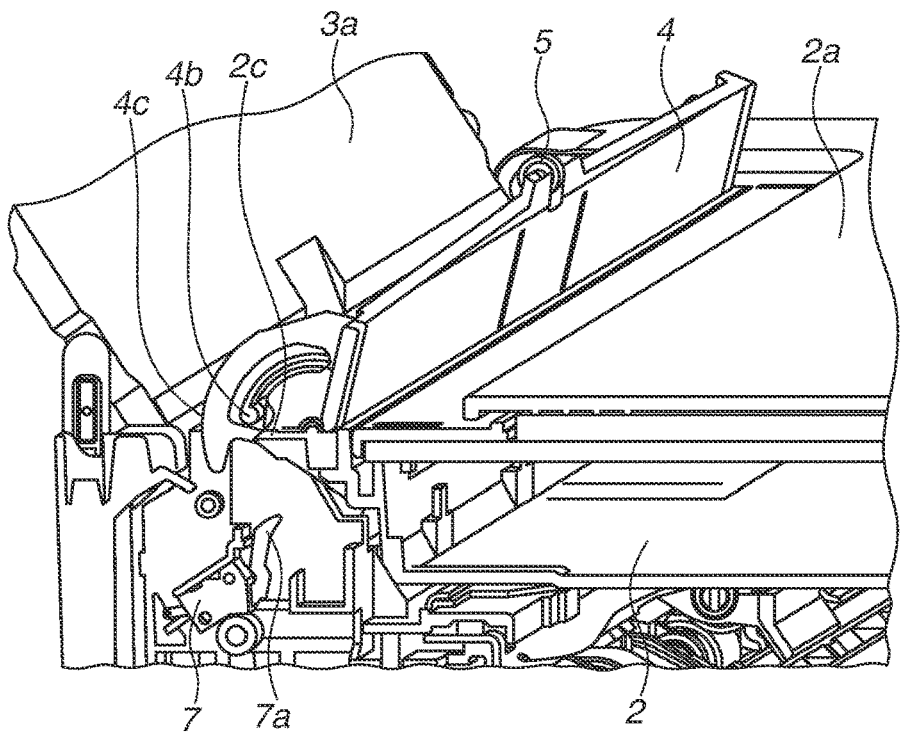
FIGS. 8A and 8B are sectional perspective views of the apparatus rear side when the paper feed tray is pulled out.

FIGS. 2B and 8A illustrates a state in which the paper feed tray 3 is pulled and the user opens the inner cover 4. When the inner cover 4 is opened, the feed port O in FIG. 2B that has been hidden appears. Then, when the user places a bundle of sheets on the paper feed tray 3, the bundle of sheets is set in a state in which the tip (bottom) of sheets is inserted into the feed port.

Figure 3A:
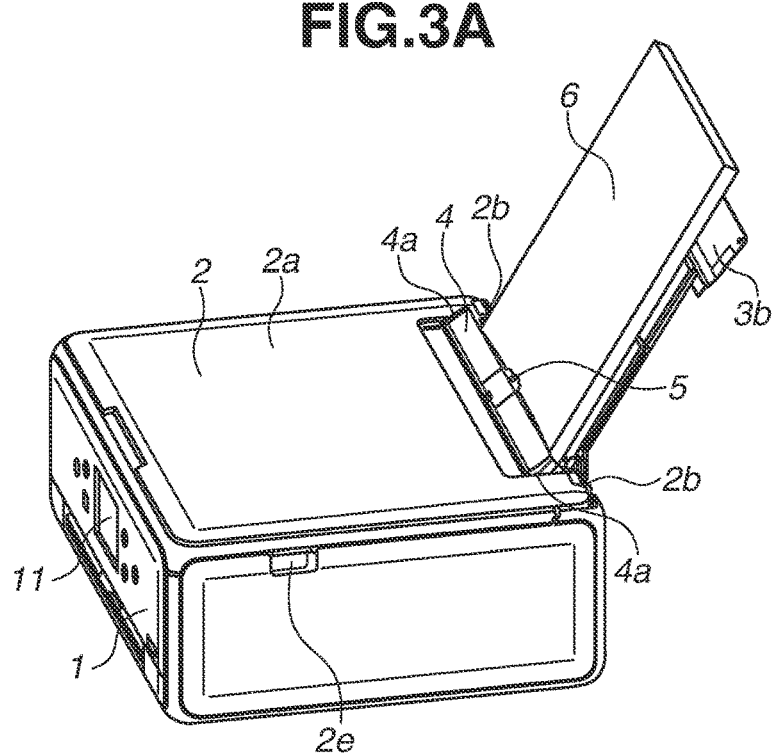
FIGS. 3A and 3B are perspective views illustrating a state in which sheets are stacked on the paper feed tray.
Figure 6A:
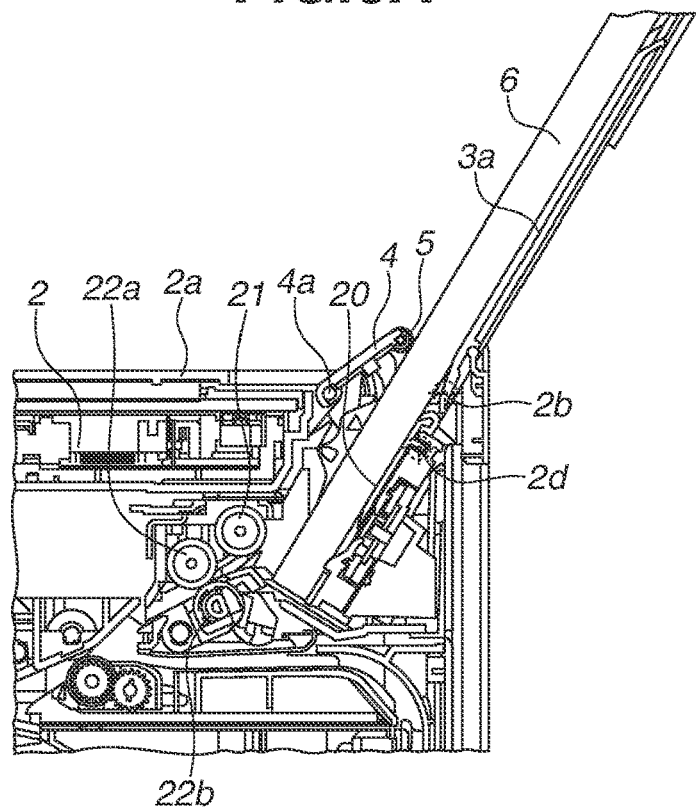
FIGS. 6A and 6B are sectional views of the apparatus rear side when sheets are stacked on the paper feed tray.
Figure 8B:
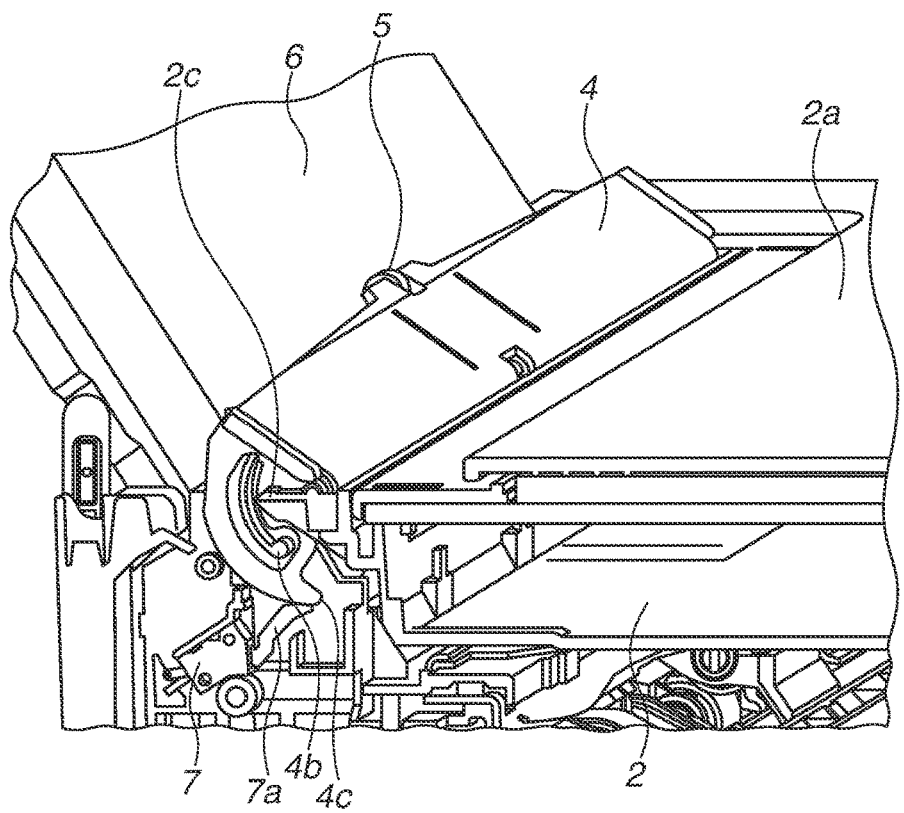

Then, when the inner cover 4 is brought back in a closing direction, the tip (roller 5) of the inner cover 4 comes into contact with the surface of the topmost sheet of the set bundle of sheets. FIGS. 3A, 6A, and 8B show such a state. The inner cover 4 is in an inclined state in which the apparatus rear side is lifted with respect to a horizontal position, i.e., the inner cover 4 leans on the sheet surface. The angle at which the inner cover 4 leans on the sheet surface changes depending on the number of sheets to be placed (thickness of the bundle of sheets). A portion of the feed port is blocked by the inserted bundle of sheets and also an exposed portion of the feed port is covered by the inner cover 4 leaning on the sheet surface, and therefore foreign matter is inhibited from falling into the feed port.

<Document Pressing Plate>

Figure 3B:
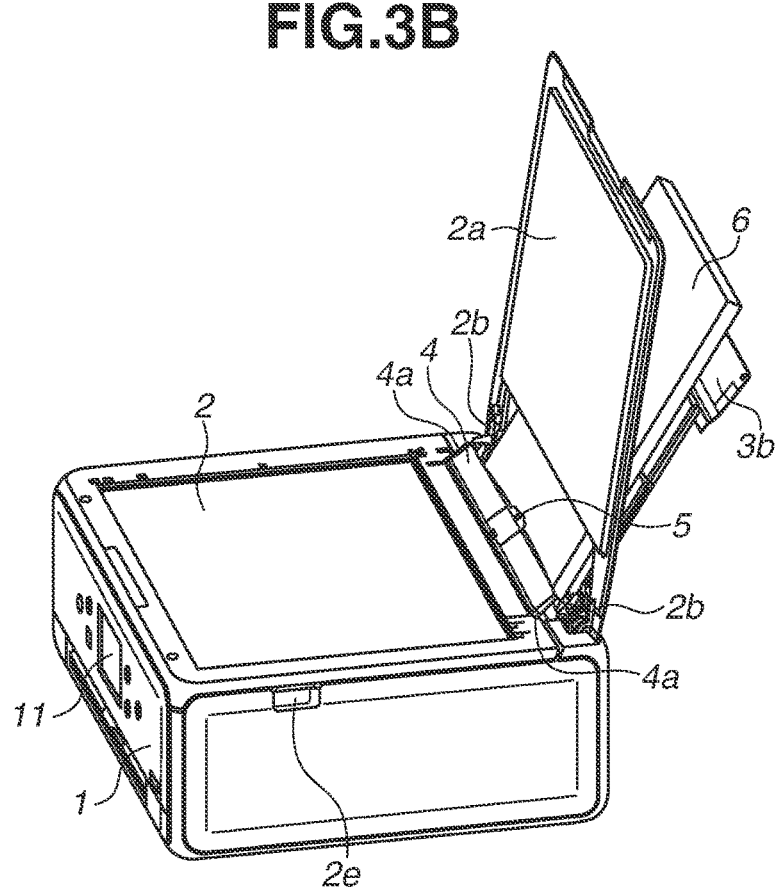

FIG. 3B illustrates a state in which the document pressing plate 2a is opened by the user. The document pressing plate 2a has an arm portion extending thinly in the depth direction in two locations on left and right sides sandwiching the feed port and the inner cover 4 therebetween and a hinge portion 2b (third hinge portion) is provided near the tip of each arm portion. The rotation axis of the hinge portion 2b (third hinge portion) of the document pressing plate 2a is positioned on the apparatus rear side of the rotation axis of the hinge portion 4a (second hinge portion) of the inner cover 4.

The document pressing plate 2a is supported by the arm portion in two locations and thus, when the document pressing plate 2a is opened and closed with respect to the platen glass, the document pressing plate 2a does not physically interfere with the inner cover 4, the paper feed flap 3b, and sheets stacked on the paper feed tray 3. In addition, when the paper feed flap 3b or the inner cover 4 is opened and closed or sheets are set to the paper feed tray 3, there is no interference with the document pressing plate 2a. Further, as illustrated in FIG. 3B, the hinge portion of the document pressing plate 2a is configured in such a manner that the document pressing plate 2a opens up to a position where no collision occurs with the paper feed tray 3 or sheets stacked on the paper feed tray 3.

<Two Opening and Closing Sensors>

Next, a cover sensor (first sensor) that detects opening and closing of the inner cover 4 will be described. The first sensor detects the opening and closing of the inner cover 4 to estimate that the user has set sheets onto the paper feed tray 3. As will be described below, based on this estimation, the user is prompted to re-set paper information such as the paper size or paper type.

Figure 7:
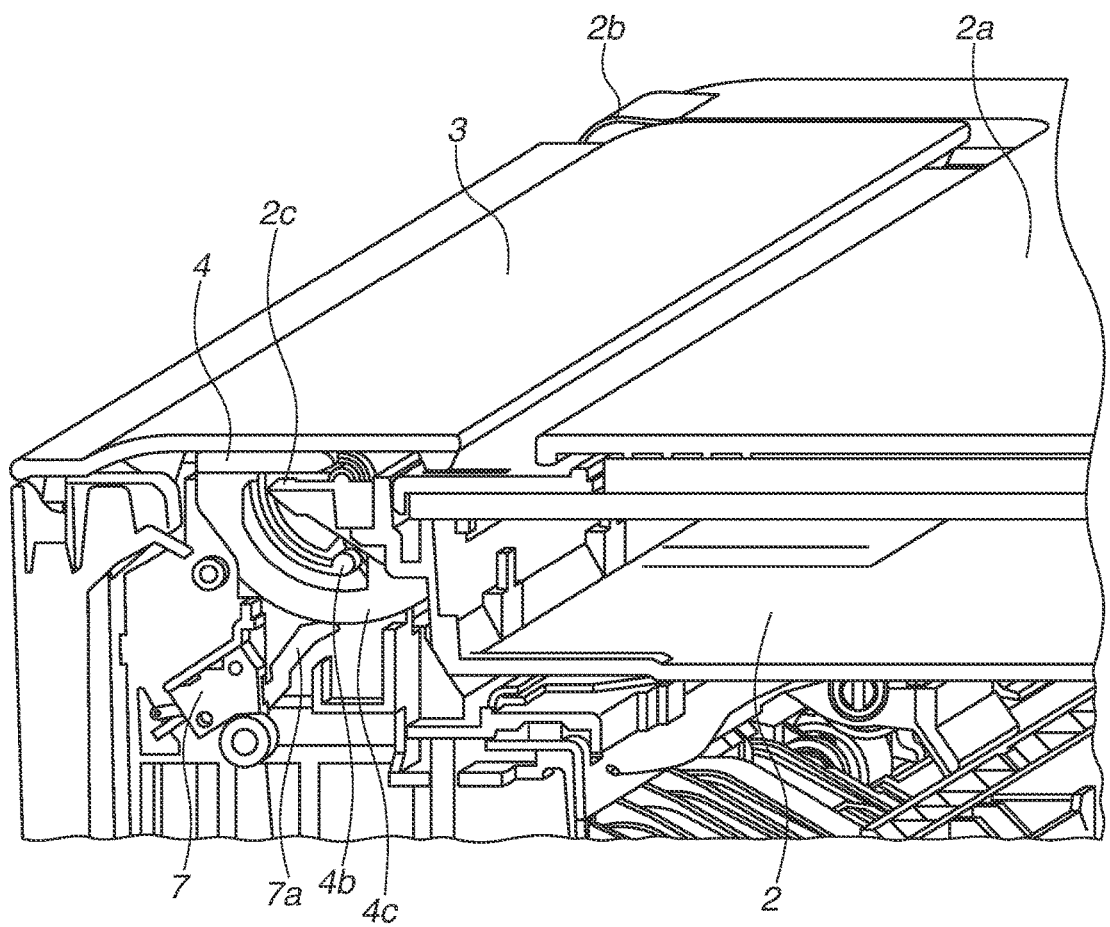
FIG. 7 is a sectional perspective view of an apparatus rear side when the paper feed tray is accommodated.
Figure 9:
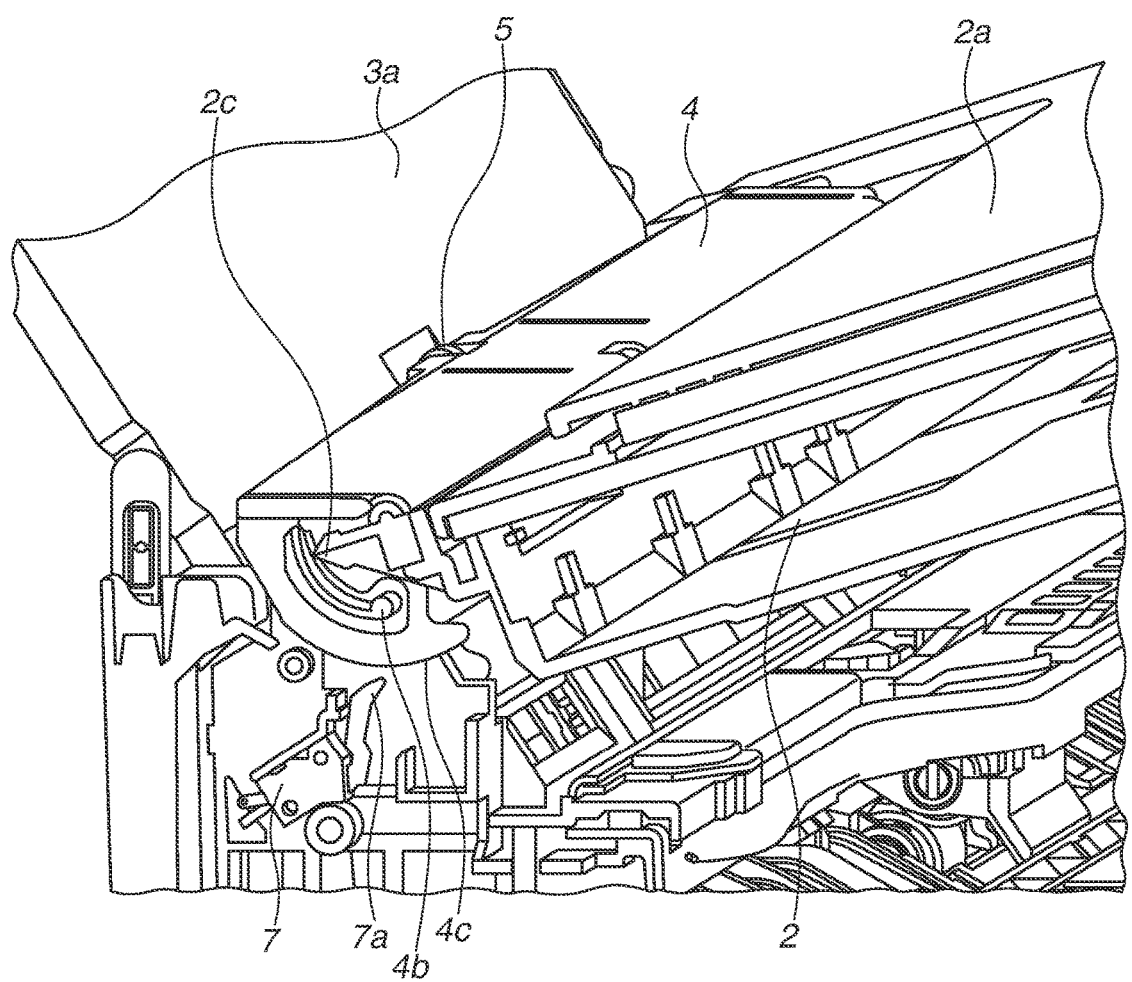
FIG. 9 is a sectional perspective view of the apparatus rear side during an operation of opening a scanner unit.

In FIGS. 7 to 9, a cover sensor 7 (mechanical switch) to detect cover opening and closing of the inner cover 4 is provided under the inner cover 4. An arm 4b to hold the cover position is provided on one end of the undersurface of the inner cover 4 and a contactor 4c in an arc shape is provided on the outer side thereof. The contactor 4c and a lever 7a of the cover sensor 7 are apart in an open state of the inner cover 4 and the switch is off (see FIG. 8A). In this state, if the inner cover 4 is closed, the contactor 4c presses the lever 7a of the cover sensor 7 and the mechanical switch is turned on so that the fact that the inner cover 4 has changed from open to close is detected (see FIG. 8B). Incidentally, sensitivity zones of a sensor are set in such a manner that the switch is turned off when the inner cover 4 is brought back even if the number of sheets stacked on the paper feed tray 3 is the maximum number of sheets that can be stacked on the tray. However, the cover sensor 7 is not limited to the mechanical switch, and proximity of a contact may be detected by using an optical sensor (photo interrupter) or a magnetic sensor.

Next, a scanner unit sensor (second sensor) that detects opening and closing of the scanner unit 2 will be described. This second sensor detects opening and closing of the scanner unit 2 to estimate that the user performs maintenance. This estimation is used for a determination to interrupt a printing or read operation.

Figure 10A:
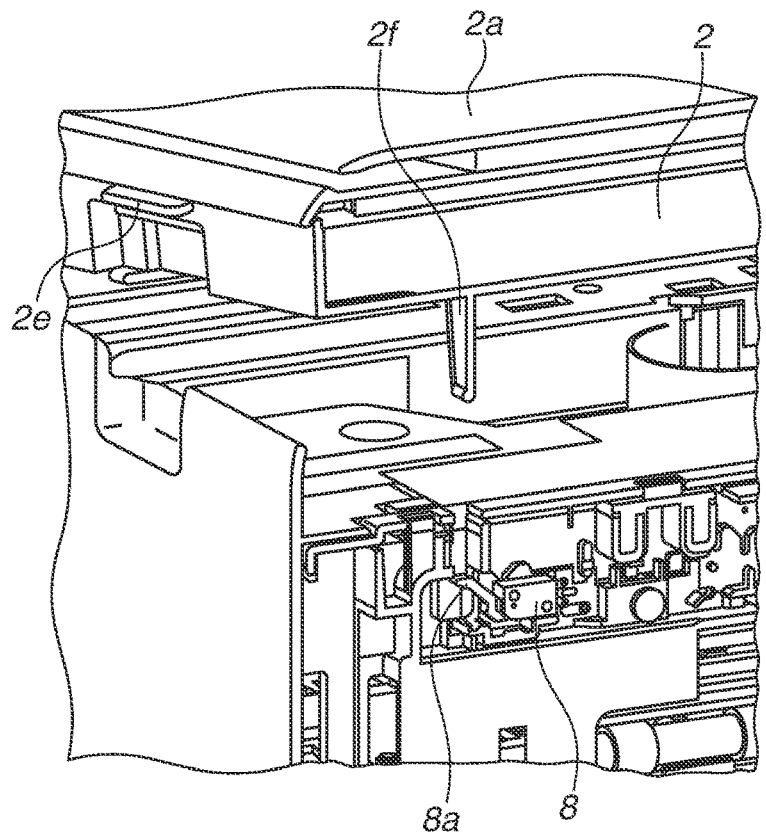
FIGS. 10A and 10B are diagrams illustrating details of an open/close sensor of the scanner unit.
Figure 10B:
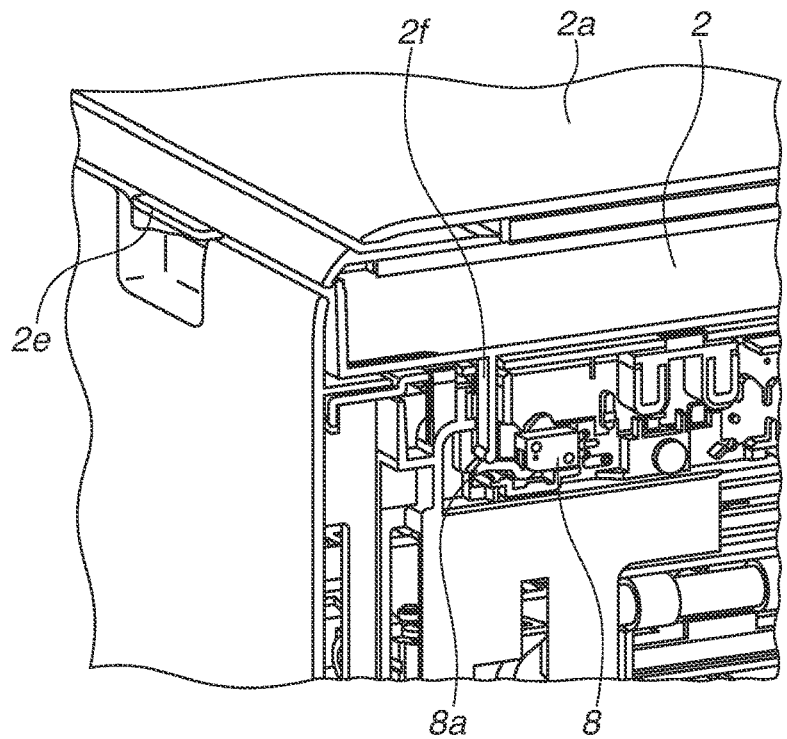

In FIGS. 10A and 10B, a scanner unit sensor 8 (mechanical switch) to detect opening and closing of the scanner unit 2 is provided on the front side of the apparatus body of the scanner unit 2. A contactor 2f in a bar shape protruding downward is provided on the front end of the undersurface of the scanner unit 2. The contactor 2f and a lever 8a of the scanner unit sensor 8 are separated in an open state of the scanner unit 2 and the switch is off (see FIG. 10A). Then, if the scanner unit 2 is closed, the contactor 2f presses the lever 8a of the scanner unit sensor 8 and the mechanical switch is turned on. Thus, the fact that the scanner unit 2 has changed from open to close is detected (see FIG. 10B). However, the scanner unit sensor 8 is not limited to the mechanical switch and proximity of a contact may be detected by using an optical sensor (photo interrupter) or a magnetic sensor. The scanner unit sensor 8 is provided on the front side of the apparatus because opening of the scanner unit 2 is thereby detected when the scanner unit 2 is slightly opened and also complete closing is reliably detected.

When, as illustrated in FIG. 9, the scanner unit 2 is gradually opened, the contactor 4c of the inner cover 4 moves away from the lever 7a of the cover sensor 7 and the fact that the inner cover 4 has opened is detected. On the other hand, the scanner unit sensor 8 of the scanner unit 2 is arranged on the front side of the scanner unit 2 and thus, the fact that the scanner unit 2 has opened is detected earlier than opening detection of the inner cover 4. On the other hand, when the scanner unit 2 in an open state is gradually closed, the fact that the inner cover 4 has closed is first detected and then, the fact that the scanner unit 2 has closed is detected. In this way, when the user opens and closes the scanner unit 2, the inner cover 4 is also opened and closed interlocking therewith and also the timings of detection of these openings and closings are different in a predetermined order with a slight time difference. This order is used in an algorithm to determine opening and closing described below.

<Control System Block>

Figure 11:
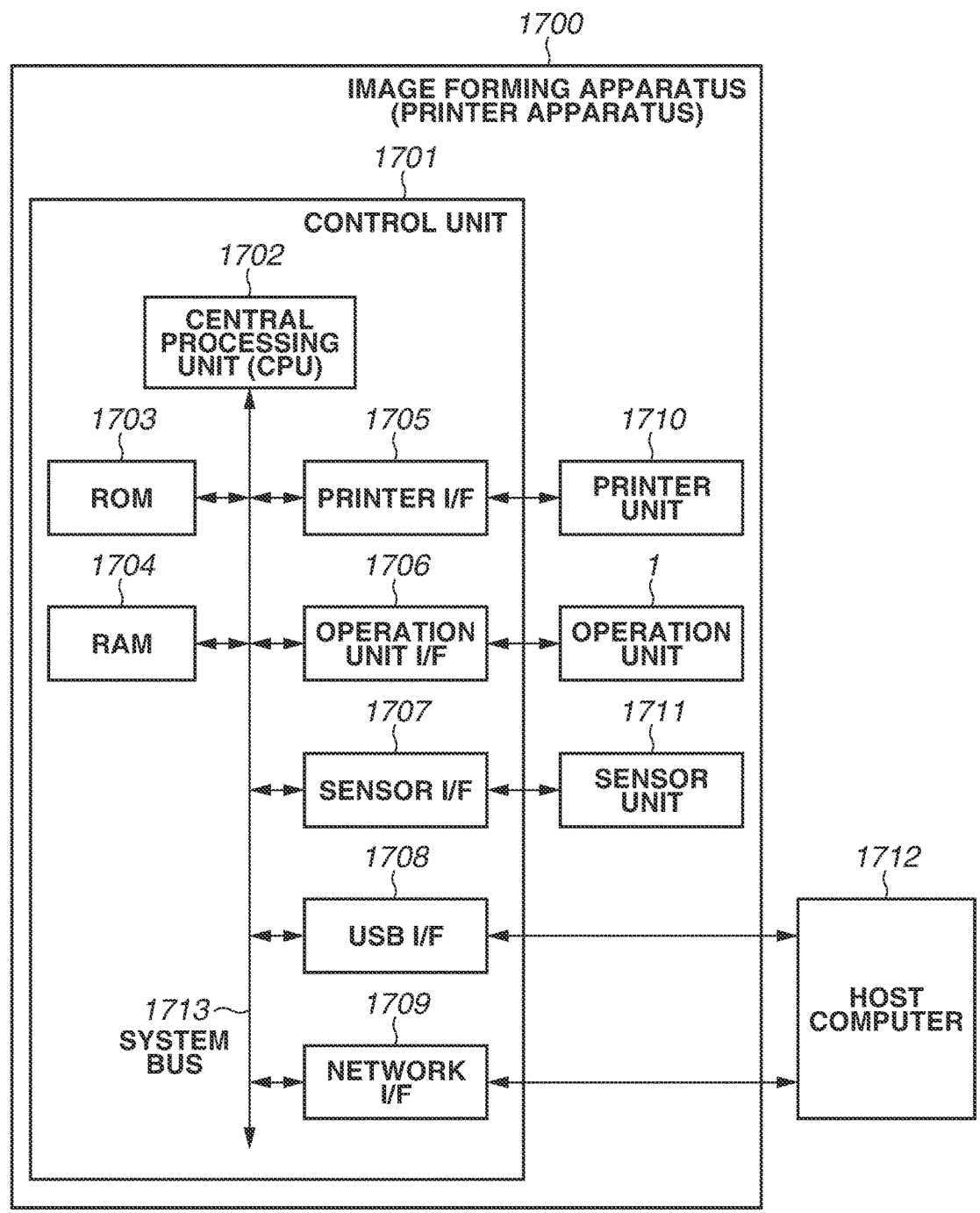
FIG. 11 is a system block diagram of the whole apparatus including a control unit.

FIG. 11 is a block diagram of a control system of the entire image forming apparatus including these two sensors. An image forming apparatus 1700 (printing apparatus) roughly includes a control unit 1701, a printer unit 1710 (including a scanner unit 2), an operation unit 1, and a sensor unit 1711 and the control unit 1701 is connected to a host computer 1712. The control unit 1701 includes a central processing unit (CPU) 1702, a rewritable read-only memory (ROM) 1703, a random access memory (RAM) 1704, and various kinds of interfaces. The interfaces include a printer interface (I/F) 1705, an operation unit I/F 1706, a sensor I/F 1707, a universal serial bus (USB) I/F 1708, and a network I/F 1709 and these interfaces are connected to the CPU 1702 via a system bus 1713. The sensor unit 1711 includes the cover sensor 7 and the scanner unit sensor 8 described above and sensors therefor. The control unit 1701 controls an overall operation of the image forming apparatus 1700.

<Operation Effect 1>

In an apparatus according to the present exemplary embodiment, as described above, the rotation axis 2d (first hinge portion) of the scanner unit 2 is positioned on the apparatus rear side of the rotation axis 4a (second hinge portion) of the inner cover 4 in an apparatus depth direction. The rotation axis 4a is provided in a higher position than the rotation axis 2d in the direction of gravity. Based on the arrangement relationship of these two rotation axes, downsizing of the apparatus is implemented.

The hinge portion 4a is mounted on the depth side of the scanner unit 2 and positioned on the apparatus front side of the hinge portion 2b and thus, if the scanner unit 2 is opened, the rotation axis 4a comes closer to the paper feed tray 3 by moving like drawing a circumference above and on the depth side. To allow the force of pressing thereby on the paper feed tray 3 by the inner cover 4 to escape, the inner cover 4 is configured to have an increasing opening angle along the inclined surface of the paper feed tray 3 with an increasing opening angle of the scanner unit 2 (see FIGS. 5A, 5B, 6A, and 6B).

Figure 5B:
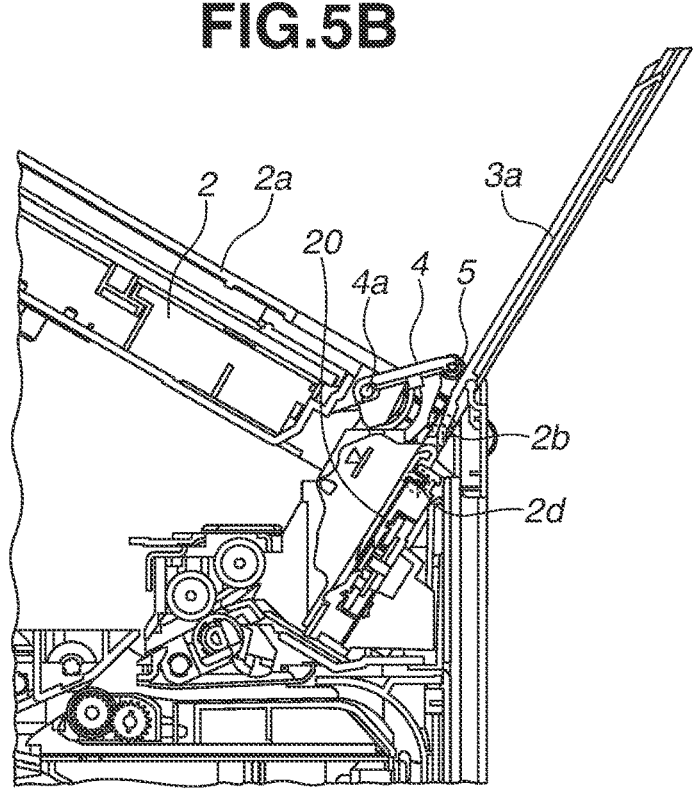
Figure 6B:
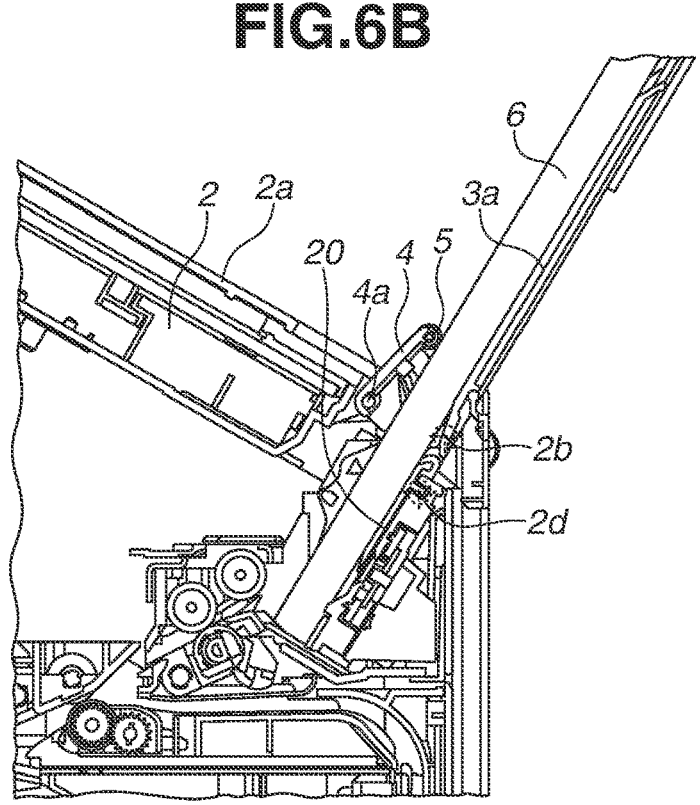

In this case, a portion (in the present example, the roller 5) of the inner cover 4 moves in contact with the surface of the paper feed tray 3 or the surface of sheets stacked on the paper feed tray 3. FIGS. 1B and 5B illustrate a state in which the scanner unit 2 is opened when no sheet is stacked and FIGS. 6B and 9 illustrate a state in which the scanner unit 2 is opened when sheets are stacked. The roller 5 moves upward while rolling in contact with the surface of the paper feed tray 3 in the former case, and the roller 5 moves upward while rolling in contact with the surface of sheets in the latter case. Because what is in contact is a rolling roller, scratches caused by sliding can be suppressed from being made to the printing side of the sheets 6. However, it is not necessarily indispensable that a portion of the inner cover 4 that comes into contact with the sheets is a roller, and scratches made to the printing side are reduced if the sliding resistance is made smaller by devising quality of material of the portion of the inner cover 4 that comes into contact with sheets or the surface finish.

Further, in an apparatus according to the present exemplary embodiment, as illustrated in FIGS. 5A, 5B, 6A, and 6B, the rotation axis 2b (third hinge portion) of the document pressing plate 2a of the scanner unit 2 is on the apparatus rear side of the rotation axis 4a (second hinge portion) of the inner cover 4 and also both are positioned at approximately the same height. The rotation axis 2d of the scanner unit 2 and the rotation axis 2b of the document pressing plate 2a are at approximately the same depth position and the rotation axis 2b is provided at a higher position than the rotation axis 2d in the direction of gravity. Thanks to this arrangement relationship, further downsizing of the image forming apparatus, particularly in the depth direction is achieved.

As illustrated in FIG. 3B, the document pressing plate 2a has a thin arm portion in two locations on both sides sandwiching the feed port and the inner cover 4 therebetween, and the rotation axis 2b is provided near the tip of each arm portion. Thus, the document pressing plate 2a and the inner cover 4 can be opened and closed independently without mutual interference. Also, if the paper feed flap 3b is opened and closed while the paper feed tray 3 is accommodated in the apparatus, there is no interference with the document pressing plate 2a. Further, the document pressing plate 2a only opens up to a position where there is no collision with the paper feed tray 3 in a pulled-out state and sheets stacked on the paper feed tray 3 and thus, there is no possibility of scratches made to sheets and breakage of the paper feed tray 3 when the document pressing plate 2a is opened.

Further, when, as illustrated in FIGS. 1A and 4, the paper feed flap 3b is closed, the inner cover 4 covers a portion or most of the feed port, and the paper feed flap 3b becomes an outer cover covering thereon. In other words, a double sealing structure covering the feed port by the inner cover 4 and the paper feed flap 3b (outer cover) is formed. This structure effectively prevents foreign matter from falling into the feed port when the apparatus is not used. Further, this structure contributes to downsizing in the height direction of the whole apparatus. Also when the apparatus is used, as illustrated in FIGS. 3A and 6, the inner cover 4 leans on the surface of sheets on the paper feed tray 3 and this does not change regardless of the number of sheets stacked thereon. Therefore, the exposure of the feed port is also small when the apparatus is used and foreign matter is effectively inhibited from falling.

<Sheet Information Setting Using Opening and Closing of Inner Cover as Trigger>

When the user sets sheets to the paper feed tray 3, the user first opens the inner cover 4, places a bundle of sheets on the paper feed tray 3, and inserts the bottom of sheets into the feed port. Then, the user closes the inner cover 4. When such opening and closing of the inner cover 4 occurs, the probability is high that sheets have newly been placed. To achieve the printing size and printing quality according to the sheet, it is necessary to update contents stored in the control unit 1701 as information about the sheet (e.g., paper size (such as A4 and B5) and paper type (such as plain paper and glossy paper)). For this reason, the open/close state of the inner cover 4 is detected by the cover sensor 7, and when the open/close state changes, information about sheets stacked on the paper feed tray 3 is set. In the present exemplary embodiment, the user is prompted to re-set through a user interface (UI) display of the operation unit and the user having viewed the UI display inputs paper information through UI. Then, the control unit 1701 sets the paper information input by the user.

However, information settings are not limited to a form in which the user is made to input information and information settings may be made automatically by acquiring information using a media sensor or a paper width sensor in the apparatus. The paper type can be determined from the reflectivity or the like of the paper surface using a media sensor. The paper size can be determined by detecting both ends of sheets stacked on the paper feed tray 3 using a paper width sensor provided on a carriage or fixed inside the apparatus. As described above, information settings in this specification include both of the form in which the user is prompted to input information and the form in which the apparatus automatically acquires and sets information.

As described above, when the user opens and closes the scanner unit 2, the inner cover 4 also opens and closes interlocking therewith. Thus, when the scanner unit 2 is opened and closed for maintenance work, the opening and closing of the inner cover 4 is detected. This may erroneously be recognized that the user has newly set sheets, leading to unnecessary information settings. Such erroneous recognition can be eliminated by using not only the cover sensor 7, but also the scanner unit sensor 8.

The basic idea is that when the open/close state of the inner cover 4 changes, information about sheets stacked on the paper feed tray 3 is set using the change thereof as a trigger. In this case, if the inner cover 4 changes from close to open, information settings are made if the scanner unit 2 remains closed, and information settings are not made if the scanner unit 2 is opened. In this way, no wasteful information settings are made in both of the form in which the user is made to input information and the form in which the apparatus automatically acquires and sets information. More detailed procedures and implementation means thereof will be described below.

FIGS. 12A, 12B, 12C, and 12D are diagrams illustrating two opening and closing timings of the scanner unit 2 and the inner cover 4 classified in four cases. In the timing charts in FIGS. 12A, 12B, 12C, and 12D, the vertical axis represents the detection state of each of the cover sensor 7 and the scanner unit sensor 8 and the detection state takes one of two states of ON and OFF. When the inner cover 4 and the scanner unit 2 is opened, the corresponding sensor becomes "ON" and when the inner cover 4 and the scanner unit 2 is closed, the corresponding sensor becomes "OFF". The horizontal axis of the timing charts represents the time (the unit is 100 msec). These timing charts are schematized to make an understanding of the determination procedures easier and the actual time is not as illustrated.

Figure 12A:
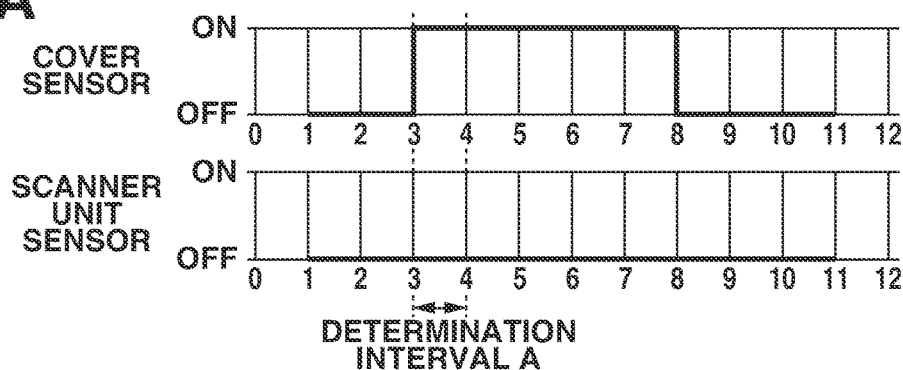
FIGS. 12A, 12B, 12C, and 12D are diagrams illustrating the scanner unit and an opening and closing operation of the inner cover in each case.

FIG. 12A is a timing chart illustrating output changes of each sensor when the user opens only the inner cover 4 and then closes the inner cover 4 without opening the scanner unit 2. This is a typical operation when the user newly sets sheets into the paper feed tray 3. The user opens the inner cover 4 to set sheets (see FIGS. 2B and 8A). Then, the detection output of the cover sensor 7 changes from OFF to ON (in this example, at the timing of time 3). The user places a bundle of sheets on the paper feed tray 3 and inserts the bottom of sheets into the feed port. Next, the user closes the inner cover 4 (see FIGS. 3A, 6A, and 8B). Then, the detection output of the cover sensor 7 changes from ON to OFF (in this example, at the timing of time 8). In this period, the detection output of the scanner unit sensor 8 remains OFF and does not change.

A determination interval A in FIG. 12A is a period to determine that the scanner unit 2 and the inner cover 4 opened approximately simultaneously in an interlocking manner. The determination interval A is set as a period of a predetermined length (100 msec) with the timing when the cover sensor 7 changes to ON being set as a starting point. Depending on whether the scanner unit sensor 8 is ON in the period, the inner cover 4 is interlocked with the scanner unit 2 if ON, and the inner cover 4 is not interlocked with the scanner unit 2 if OFF. In this example, the scanner unit sensor 8 remains OFF in the determination interval A and does not change. Thus, the opening of the inner cover 4 is determined to be caused by an intentional cover operation of the user, so that loading of sheets on the paper feed tray 3 can be estimated.

If the output of only the cover sensor 7 changes as described above, the probability is high that sheets are newly set to the paper feed tray 3. In this case, the apparatus needs to update information (e.g., paper size and paper type) about the sheets. Then, information about the sheets stacked on the paper feed tray 3 is set. More specifically, when only the cover sensor 7 changes from ON to OFF in this order (the timing when changing to ON or OFF and the time interval thereof do not matter) as illustrated in FIG. 12A, the control unit 1701 (CPU 1702) executes a sequence to set information about sheets. In this example, the user is prompted to make input settings of "paper size" and "paper type" as information about the set sheets and the display unit 11 of the operation unit 1 is caused to display an information input screen like a screen illustrated in FIG. 15. Alternatively, the information input may also be done through UI of a host PC connected to the image forming apparatus. In FIG. 15A, the paper size (A4) and the paper type (plain paper) are displayed as currently set information. If the user who has viewed the information selects information to be re-set, a pull-down menu as illustrated in FIG. 15B appears so that the information can be updated. In this example, a selection is made from the menu to re-set the paper size to B5. Then, if the registration button is pressed, the information is updated and set. If the newly set sheets are the same as sheets used previously, the user presses the registration button without changing the content. The paper information is stored in a memory of the control unit 1701 and used for printing.

Figure 12B:
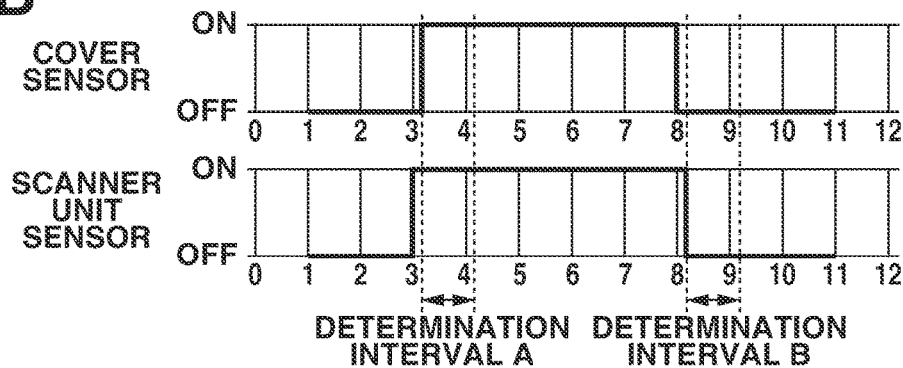

FIG. 12B is a timing chart illustrating output changes of each sensor when the user opens the scanner unit 2 and closes the scanner unit 2 again. This is a typical operation when the user opens the scanner unit 2 for maintenance of the printer unit 1710. Though the user does not intend to open the inner cover 4, the inner cover 4 is also opened interlocking with the opening of the scanner unit 2. In this case, the user opens the scanner unit 2 for ink replacement or jam handling (see FIGS. 1B, 5B, and 6B). Then, the scanner unit sensor 8 changes from OFF to ON (in this example, at the timing of time 3). Immediately thereafter, the detection output of the cover sensor 7 changes from OFF to ON (in this example, at the timing of a few tens of milliseconds after time 3). The user does the maintenance work of the printer unit and, when the work is finished, closes the scanner unit 2. Then, first the cover sensor 7 changes from ON to OFF (in this example, at the timing of time 8). Immediately thereafter, the scanner unit sensor 8 changes from ON to OFF (in this example, at the timing of a few tens of milliseconds after time 8). As described above, the inner cover 4 is opened and closed interlocking with the opening and closing of the scanner unit 2, and there is a little time lag between opening and closing detection times of the two sensors. Thus, with the detection output of the scanner unit sensor 8, the detection output of the cover sensor 7 also changes after a little time lag.

As described above, the determination interval A is a period to determine that the scanner unit 2 and the inner cover 4 opened approximately simultaneously in an interlocking manner. In this example, the output of the scanner unit sensor 8 is ON in the determination interval A and thus, the inner cover 4 is determined to have opened interlocking with the scanner unit 2.

On the other hand, a determination interval B is a period to determine that the scanner unit 2 and the cover sensor 7 closed approximately simultaneously. The determination interval B is set as a period of a predetermined length (100 msec) with the timing when the scanner unit sensor 8 changes from ON to OFF being set as a starting point. In this period, whether the cover sensor 7 is OFF is determined. The cover sensor 7 is OFF in this example and thus, the inner cover 4 is determined to have closed interlocking with the closing of the scanner unit 2. In both of the determination interval A and the determination interval B, the presence of interlocking is determined. If the absence of interlocking is determined (the user performed an individual operation) in at least one of the determination interval A (opening operation) and the determination interval B (closing operation), the control unit 1701 performs control using an algorithm that executes an information setting sequence. There is no interlocking in both of the opening and closing in this case and thus, the control unit 1701 does not execute an above-described information setting sequence regarding the sheets. If output changes of both of the cover sensor 7 and the scanner unit sensor 8 occur after a little time lag as described above, the probability is high that the user opened and closed the scanner unit 2 for maintenance and the control unit 1701 does not execute an above-described information setting sequence regarding the sheets.

Information about sheets is set only when the user performs an opening and closing operation of only the inner cover 4 depending on cases like in FIGS. 12A and 12B. More specifically, when the inner cover 4 changes from close to open, an information setting sequence is executed if the scanner unit 2 remains closed and an information setting sequence is not executed if the scanner unit 2 opens. In reality, most cases are the case of FIG. 12A or FIG. 12B, but in the present exemplary embodiment, the following rare cases are further considered.

Figure 12C:
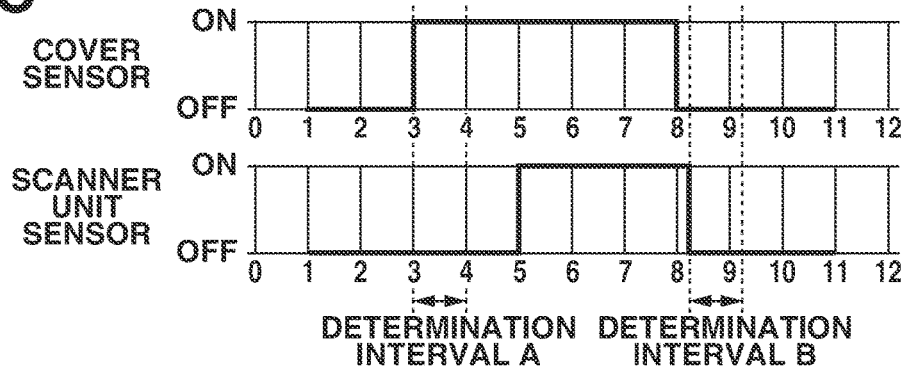

FIG. 12C is a timing chart in a case where the user successively opens both of the inner cover 4 and the scanner unit 2. This case assumes a user operation to open the inner cover 4 first and then open the scanner unit 2. It is assumed that the user opens the inner cover 4 to set sheets into the paper feed tray 3 and then the user further opens the scanner unit 2 for maintenance of the printer unit while the inner cover 4 is open. In this case, the cover sensor 7 changes from OFF to ON at time 3 and the scanner unit sensor 8 changes from OFF to ON at time 5 after a considerable delay. If the scanner unit sensor 8 changes to ON out of the determination interval A that starts ON of the cover sensor 7 as described above, the opening of the inner cover 4 is determined to be caused by an intentional cover operation of the user, so that loading of sheets can be assumed. The user who has finished the loading of sheets closes the inner cover 4. However, the scanner unit 2 is open and thus, even if the inner cover 4 is closed, the cover sensor 7 maintains ON and does not change to OFF (see FIG. 9). Then, the user finishes printer maintenance (e.g., ink replacement) and closes the scanner unit 2. At that time, the cover sensor 7 changes from ON to OFF. Then, after a delay of a few tens of millisecond, the scanner unit sensor 8 changes from ON to OFF in the determination interval B. In other words, the absence of interlocking is determined in the determination interval A and the presence of interlocking is determined in the determination interval B. In this case, both of setting of sheets into the paper feed tray 3 and maintenance are done and thus, information about the sheets needs to be set. If, as described above, the absence of interlocking is determined in at least one of the determination interval A and the determination interval B, the control unit 1701 performs control using an algorithm that executes an information setting sequence. Therefore, in this case, the control unit 1701 gives higher priority to the determination that there is no interlocking in the determination interval A and executes a sequence for prompting the user to input paper information on the information setting screen illustrated in FIG. 15.

Figure 12D:
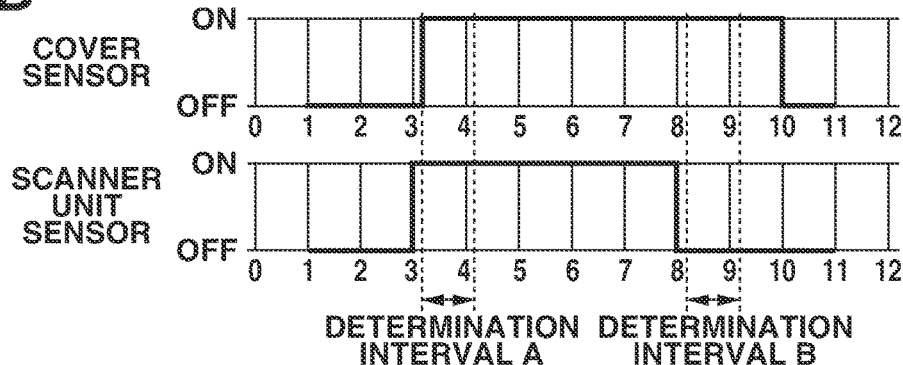

FIG. 12D is a timing chart in a case where the user successively closes both of the scanner unit 2 and the inner cover 4. This case assumes a case in which the user performs procedures in reverse order to FIG. 12C. First, the user opens the scanner unit 2. The scanner unit sensor 8 changes from OFF to ON at time 3. Correspondingly, the cover sensor 7 changes from OFF to ON after a slight delay. The presence of interlocking is determined in the determination interval A. Next, the user opens the inner cover 4 to set sheets. The cover sensor 7, which is already ON, maintains ON and does not change. Next, the user finishes printer maintenance and closes the scanner unit 2. Then, the detection of the scanner unit sensor 8 changes from ON to OFF at time 8, but the inner cover 4 remains open and thus, the cover sensor 7 maintains ON. Therefore, the absence of interlocking is determined in the determination interval B. Then, the user sets sheets and closes the inner cover 4. At that time, the cover sensor 7 finally changes from ON to OFF at time 10. Also in this case, like the case of FIG. 12C, both of setting of sheets into the paper feed tray 3 and maintenance are done and thus, information about the sheets needs to be set. If the absence of interlocking is determined in at least one of the determination interval A and the determination interval B, as described above, the control unit 1701 performs control using an algorithm that executes an information setting sequence. Thus, in this case, the control unit 1701 gives higher priority to the determination that there is no interlocking in the determination interval B and executes a sequence for prompting the user to input paper information on the information setting screen illustrated in FIG. 15.

In this example, both of the determination interval A and the determination interval B have a predetermined period (100 msec), but this numeric value may be set according to the detection timing and precision of the sensor. There are various techniques for time measurements of the predetermined period. For example, there may be a technique of measuring time by counting up or counting down the counter of the control unit 1701 at regular intervals, and a technique of measuring a predetermined period using a timer and causing an interrupt can be cited. As still another method, a method of preparing a flag that becomes ON while the counter is updated or a timer interrupt wait occurs and referring to the flag is known.

The timing charts in FIGS. 12A, 12B, 12C, and 12D assume that when the scanner unit 2 is opened, sensing is performed in such a manner that the scanner unit sensor 8 first becomes ON and after a slight delay, the cover sensor 7 becomes ON in this order. Depending on the arrangement relationship of the two sensors, the detection by the two sensors may be simultaneous or the order thereof may be reversed. The determination order or the length of the determination interval of FIGS. 12A to 12D may be changed according to such cases.

<Specific Procedures>

More specifically, the determination algorithm of the control unit 1701 described above is implemented by the procedures described below. The flowchart in FIG. 13 is a procedure executed when the cover sensor 7 changes from ON to OFF and determines whether to set information according to this procedure. This is executed at time 8 in the cases of FIGS. 12A to 12C and at time 10 in the case of FIG. 12D.

In step S2001 of FIG. 13, whether "interlocking flag" is ON is determined. The interlocking flag is a flag indicating whether the inner cover 4 is opened interlocking with the opening of the scanner unit 2 or by a user's operation independently without interlocking therewith. The flag value is ON (1) in the former case and OFF (0) in the latter case. The interlocking flag is set OFF as the initial value.

In step S2001, if the interlocking flag is ON (YES in step S2001), the processing proceeds to step S2003, and if the interlocking flag is OFF (NO in step S2001), the processing proceeds to step S2002. The processing proceeds from step S2001 to step S2002 when the opening of the inner cover 4 is considered to be caused by a user's operation (cases of FIGS. 12A and 12C). In step S2002, the control unit 1701 causes the operation unit to display the information input screen illustrated in FIG. 15 to prompt the user to input information about the sheets. The control unit 1701 sets information based on the user input.

In step S2003, whether the scanner unit sensor 8 is OFF is determined. If the scanner unit sensor 8 is OFF (YES in step S2003), the processing proceeds to step S2004. If the scanner unit sensor 8 is not OFF (No in step S2003), the presence of interlocking is assumed (the case in FIG. 12B) and the sequence is terminated without setting sheet information. In step S2004, whether OFF of the scanner unit sensor 8 has occurred within the range of the determination interval A (100 msec) is determined. This is a determination in the determination interval A described above. If it is determined that OFF of the scanner unit sensor 8 has occurred within the range (YES in step S2004), the presence of interlocking is assumed and the sequence is terminated. If it is determined that OFF of the scanner unit sensor 8 has not occurred within the range (NO in step S2004) (the case in FIG. 12D), the absence of interlocking is assumed and the processing proceeds to step S2002 to set information.

Figure 14:
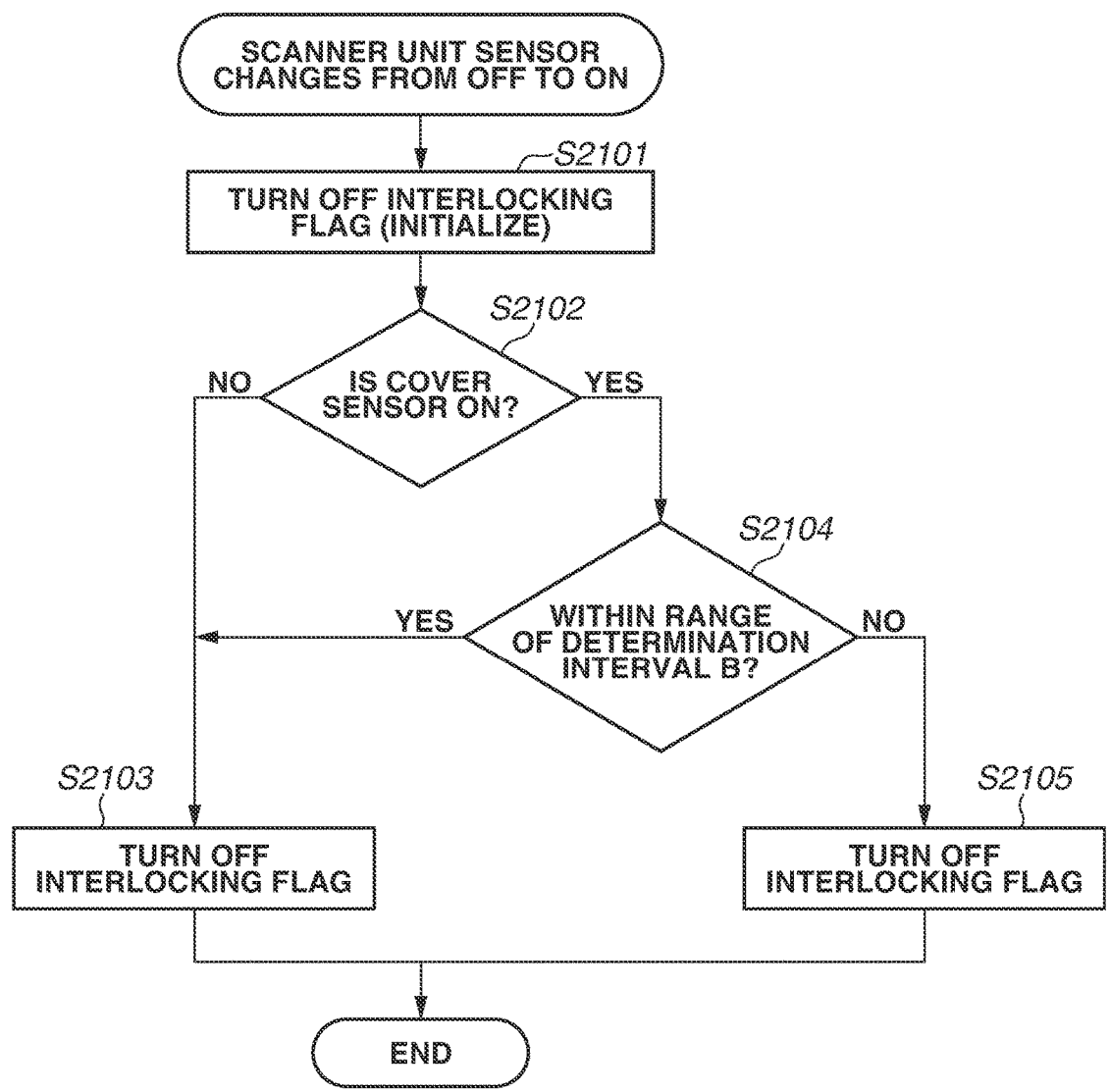

The flowchart in FIG. 14 is a processing procedure executed when the scanner unit sensor 8 changes from OFF to ON and determines the flag value of the above "interlocking flag" (step S2001 in FIG. 13) described above in advance according to the procedure. This is not executed in the case of FIG. 12A and executed at time 3 in the case of FIG. 12B, at time 5 in the case of FIG. 12C, and at time 3 in the case of FIG. 12D.

In step S2101 of FIG. 14, the flag value of the interlocking flag is initialized to OFF (0). In step S2102, whether the cover sensor 7 is ON is determined. If the cover sensor 7 is ON (YES in step S2102), the processing proceeds to step S2104 and if the cover sensor 7 is not ON (NO in step S2102), the processing proceeds to step S2103. In step S2103, the flag value of the interlocking flag is set to OFF (0) by assuming the absence of interlocking and then, the sequence is terminated. In step S2104, whether ON of the cover sensor has occurred within the range of the determination interval B (100 msec) is determined. This is a determination in the determination interval B described above. If ON of the cover sensor has occurred within the range of the determination interval B (YES in step S2104), the processing proceeds to step S2103 and the flag value of the interlocking flag is set to ON (1) by determining the presence of interlocking and then, the sequence is terminated. If ON of the cover sensor has not occurred within the range of the determination interval (NO in step S2104), the processing proceeds to step S2105 and the flag value of the interlocking flag is set to OFF (0) by determining the absence of interlocking and then, the sequence is terminated.

As described above, if at least one of the opening operation (determination interval A) and the closing operation (determination interval B) of the inner cover 4 is determined not to be interlocked with the opening and closing of the scanner unit 2, information about the sheets stacked on the paper feed tray 3 can be set. On the other hand, if both of the opening and closing of the inner cover 4 are determined to be interlocked with the opening and closing of the scanner unit 2, information about the sheets is not set.

In addition, the cases of FIGS. 12C and 12D are rare and thus, without assuming these cases, the cases of FIGS. 12A and 12B may be distinguished by a simpler algorithm. For example, whether to set information may be determined by making a determination based on only the opening operation (determination interval A) or the closing operation (determination interval B) of the inner cover 4. In this case, as the algorithm, information is set if the opening operation (determination interval A) or the closing operation (determination interval B) of the inner cover 4 is not interlocked with the opening and closing of the scanner unit 2 and information is not set if both operations are interlocked with the opening and closing of the scanner unit 2.

<Operation Effect 2>

According to the present exemplary embodiment, the user is prompted to set information about sheets to be set to the paper feed tray using the opening of the inner cover 4 as a trigger and thus, the apparatus can perform printing suitable for the paper size and paper type. Then, if the user does not intend to set sheets to the paper feed tray, the user is not prompted to set information, so that the user is not confused. Therefore, an image forming apparatus with high usability can be implemented. Also, even in a form in which the apparatus automatically acquires and sets information, reduced throughput of the apparatus due to wasteful automatic setting operations can be prevented. Therefore, an image forming apparatus with high usability can be implemented. Information about sheets can be set using the opening and closing of a cover covering the feed port of the paper feed tray 3 as a trigger as described above and therefore, an apparatus excellent in usability can be implemented.

In the exemplary embodiment described above, the scanner unit is not required to be a flat-bed type and may be a sheet-through scanner unit having no document pressing plate. The present invention is not limited to a configuration in which the inner cover is opened interlocking with the opening of the scanner unit and is also effective in a configuration in which the inner cover is opened interlocking with some unit that opens and closes with respect to the housing of a printing apparatus. The present invention is also effective in preventing an erroneous determination in a configuration in which the inner cover may move when a strong vibration is applied to the apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-150422, filed Jul. 29, 2016, and No. 2016-150423, filed Jul. 29, 2016, which are hereby incorporated by reference herein in their entirety.

What is claimed is:

1. An image forming apparatus comprising:
a printer unit;
a scanner unit provided above the printer unit and configured to read a document, wherein the scanner unit is openable with respect to the printer unit due to a first hinge portion on a rear side of the image forming apparatus opposite to a front side of the image forming apparatus;
a paper feed tray on which a sheet to be fed from a feed port to the printer unit is to be placed, wherein the paper feed tray includes a tray body configured to be accommodated in a drawable manner on the rear side of the image forming apparatus and a flap configured to pivotally move with respect to the tray body; and
an inner cover provided to be openable with respect to the feed port, wherein the inner cover is openable on the rear side of the image forming apparatus due to a second hinge portion different from the first hinge portion,
wherein a rotation axis of the second hinge portion is provided on the front side of the image forming apparatus relative to a rotation axis of the first hinge portion, and
wherein the flap of the paper feed tray becomes an outer cover covering the inner cover in a closed state in a case where the tray body is accommodated, and becomes an extended tray extending a sheet placement surface of the tray body in a case where the tray body is pulled out.

2. The image forming apparatus according to claim 1, wherein interlocking with an operation to open the scanner unit, the second hinge portion moves to the image forming apparatus rear side and the inner cover moves while being in contact with a surface of the paper feed tray or a surface of the sheet placed on the paper feed tray.

3. The image forming apparatus according to claim 2, wherein the feed port is configured to receive the sheet in a case where the inner cover is opened.

4. The image forming apparatus according to claim 2, wherein the inner cover includes a roller, and the roller comes into contact with the surface of the paper feed tray or the surface of the sheet placed on the paper feed tray.

5. The image forming apparatus according to claim 1, wherein the scanner unit includes a document pressing plate configured to press a document and is openable with respect to the scanner unit due to a third hinge portion, and
wherein a rotation axis of the third hinge portion is positioned on the image forming apparatus rear side of the rotation axis of the second hinge portion.

6. The image forming apparatus according to claim 5, wherein the document pressing plate includes a first arm portion and a second arm portion connected to the third hinge portion, and
wherein the feed port and the inner cover are provided between the first arm portion and the second arm portion.

7. The image forming apparatus according to claim 1, wherein the tray body is vertically accommodated on the rear side of the printer unit and the sheet placement surface is formed by pulling the tray body upward and then lowering the tray body obliquely to the rear.

8. The image forming apparatus according to claim 1, wherein the scanner unit includes a document pressing plate configured to press a document and is openable with respect to the scanner unit, and
wherein the flap and the document pressing plate are provided to be able to pivotally move without interference with each other.

9. The image forming apparatus according to claim 8, wherein, when the document pressing plate and the flap are both closed, a surface of the document pressing plate and a surface of the flap have approximately a same height and a recess portion is formed between an end portion of the flap and a rear end portion of the document pressing plate.

10. The image forming apparatus according to claim 1, further comprising:
a first sensor configured to detect an open/close state of the inner cover;
a second sensor configured to detect an open/close state of the scanner unit; and
a display unit configured to display setting information about the sheet placed on the paper feed tray based on detection by the first sensor and the second sensor.

11. An image forming apparatus comprising:
a printer unit;
a paper feed tray on which a sheet to be fed from a feed port to the printer unit is to be placed;
a first cover configured to be openable with respect to the feed port;
a first sensor configured to detect an open/close state of the first cover;
a second cover provided above the printer unit and configured to be openable with respect to the printer unit;
a second sensor configured to detect an open/close state of the second cover; and
a display unit configured to display setting information about the sheet placed on the paper feed tray in a case where a change in the open/close state of the first cover is detected by the first sensor,
wherein the display unit does not display the setting information in a case where the first sensor detects a change from the close state to the open state of the first cover due to interlocking with opening of the second cover or in a case where the first sensor detects a change from the open state to the close state of the first cover due to interlocking with closing of the second cover.

12. The image forming apparatus according to claim 11, wherein, in a case where the first sensor detects that the first cover has changed from the close state to the open state, the display unit displays the setting information if the second sensor does not detect opening of the second cover within a first period from the detection of opening of the first cover by the first sensor, and does not display the setting information if the second sensor detects opening of the second cover within the first period from the detection of opening of the first cover by the first sensor.

13. The image forming apparatus according to claim 11, wherein the second cover includes a scanner unit configured to read a document by pressing the document using a document pressing plate.

14. The image forming apparatus according to claim 11, wherein the paper feed tray is provided on a rear side of apparatus.

15. The image forming apparatus according to claim 11, wherein the display unit displays the setting information in a case where the first sensor detects that the first cover has changed from close to open.

16. The image forming apparatus according to claim 11, wherein, in a case where the second sensor detects that the second cover has changed from the close state to the open state, the display unit displays the setting information if the first sensor does not detect opening of the first cover within a second period from the detection of opening of the second cover by the second sensor, and does not display the setting information if the first sensor detects opening of the first cover within the second period from the detection of opening of the second cover by the second sensor.

17. An image forming apparatus comprising:
a printer unit;
a paper feed tray on which a sheet to be fed from a feed port to the printer unit is to be placed;
a first cover configured to be openable with respect to the feed port;
a first sensor configured to detect an open/close state of the first cover;
a second cover provided above the printer unit and configured to be openable with respect to the printer unit;
a second sensor configured to detect an open/close state of the second cover; and
a display unit configured to display setting information about the sheet placed on the paper feed tray in a case where a change in the open/close state of the first cover is detected by the first sensor,
wherein the display unit does not display the setting information in a case where the first sensor detects a change from the close state to the open state of the first cover and the second sensor detects a change from the close state to the open state of the second cover and in a case where the first sensor detects a change from the open state to the close state of the first cover and the second sensor detects a change from the open state to the close state of the second cover.

* * * * *